US010030743B2

(12) United States Patent
Young et al.

(10) Patent No.: US 10,030,743 B2
(45) Date of Patent: Jul. 24, 2018

(54) CHAIN TENSIONER PLASTIC BLADE WITH IMPROVED STRUCTURAL RIGIDITY AT THE SPRING-END REACTION SURFACES OF THE BLADE

(71) Applicant: Cloyes Gear and Products, Inc., Fort Smith, AR (US)

(72) Inventors: James D. Young, Chesaning, MI (US); David J. Stone, Clinton Township, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 303 days.

(21) Appl. No.: 15/064,239

(22) Filed: Mar. 8, 2016

(65) Prior Publication Data

US 2016/0265632 A1 Sep. 15, 2016

Related U.S. Application Data

(60) Provisional application No. 62/130,414, filed on Mar. 9, 2015.

(51) Int. Cl.
 *F16H 7/08* (2006.01)
 *F16H 7/18* (2006.01)

(52) U.S. Cl.
 CPC .......... *F16H 7/08* (2013.01); *F16H 7/18* (2013.01); *F16H 2007/0804* (2013.01); *F16H 2007/0872* (2013.01)

(58) Field of Classification Search
 CPC ........... F16H 2007/0804; F16H 7/08; F16H 2007/0872; F16H 7/18; F16H 2007/0893
 (Continued)

(56) References Cited

U.S. PATENT DOCUMENTS 3,358,522 A 12/1967 Poyser et al.
3,490,302 A * 1/1970 Poyser .................. F16H 7/08
 474/111

(Continued)

FOREIGN PATENT DOCUMENTS

EP 1 030 078 A2 8/2000
EP 1 258 656 A2 11/2002

OTHER PUBLICATIONS

International Search Report dated May 31, 2016 for International application No. PCT/US2016/021376.
(Continued)

*Primary Examiner* — Henry Y Liu
(74) *Attorney, Agent, or Firm* — Fay Sharpe LLP

(57) ABSTRACT

A chain tensioner includes a blade assembly operatively connected to a bracket. The blade assembly includes a plastic blade and a spring, with a first spring end located in a first slot and a second spring end located in a second slot. The first spring end contacts a first lower wall at a first contact location and the second spring end contacts a second lower wall at a second contact location. A pivot end spring force vector $SF_P$ acts on the first lower wall at the first contact location and a free end spring force vector $SF_R$ acts on the second lower wall at the second contact location. A chain is in contact with the outer surface of the blade. The blade assembly is mounted on the bracket with a bracket pin located in the pivot bore and with the foot of the blade supported on a bracket ramp. A pivot pin force vector $F_P$ acts on an inside diameter of the pivot bore through the pivot axis. A ramp force vector $F_R$ acts on the blade foot at a ramp contact location. The ramp force vector $F_R$ and the free end spring force vector $SF_R$ are aligned and coincident with each other.

20 Claims, 16 Drawing Sheets

(58) Field of Classification Search
USPC .......................................................... 474/110
See application file for complete search history.

(56) References Cited

U.S. PATENT DOCUMENTS

| | | | | |
|---|---|---|---|---|
| 4,921,472 A * | 5/1990 | Young | ................. | F16H 7/08 474/111 |
| 5,055,088 A * | 10/1991 | Cradduck | ................. | F16H 7/08 474/111 |
| 5,266,066 A * | 11/1993 | White | ................. | F16H 7/08 474/111 |
| 5,286,234 A * | 2/1994 | Young | ................. | F16H 7/08 474/111 |
| 5,425,680 A * | 6/1995 | Young | ................. | F01L 1/02 474/111 |
| 5,711,732 A * | 1/1998 | Ferenc | ................. | F16H 7/08 474/101 |
| 5,730,674 A | 3/1998 | Ott | | |
| 5,797,818 A * | 8/1998 | Young | ................. | F16H 7/0838 474/111 |
| 5,984,815 A * | 11/1999 | Baddaria | ................. | F01L 1/02 474/111 |
| 6,238,311 B1 * | 5/2001 | Cutting | ................. | F16H 7/08 474/109 |
| 6,322,469 B1 | 11/2001 | Markley | | |
| 6,354,972 B1 * | 3/2002 | Young | ................. | F16H 7/08 474/101 |
| 6,364,796 B1 * | 4/2002 | Nakamura | ................. | F16H 7/08 474/111 |
| 6,375,587 B1 * | 4/2002 | Wigsten | ................. | F16H 7/08 474/109 |
| 6,406,391 B1 | 6/2002 | Ullein | | |
| 6,440,020 B1 | 8/2002 | Tada | | |
| 6,524,202 B1 * | 2/2003 | Tada | ................. | F16H 7/08 474/109 |
| 6,572,502 B1 * | 6/2003 | Young | ................. | F16H 7/08 474/111 |
| 6,609,985 B2 * | 8/2003 | Todd | ................. | F16H 7/0829 474/103 |
| 6,609,986 B1 | 8/2003 | Wigsten | | |
| 6,612,952 B1 | 9/2003 | Simpson et al. | | |
| 6,612,953 B2 | 9/2003 | Tada | | |
| 6,616,557 B2 * | 9/2003 | Tsuruta | ................. | F16H 7/08 474/111 |
| 6,623,391 B2 | 9/2003 | Young et al. | | |
| 6,641,496 B2 * | 11/2003 | Tada | ................. | F16H 7/0829 474/101 |
| 6,808,467 B2 * | 10/2004 | Takeda | ................. | F16H 7/08 474/111 |
| 6,835,149 B2 | 12/2004 | Konno et al. | | |
| 6,902,505 B2 * | 6/2005 | Yonezawa | ................. | F16H 7/08 474/101 |
| 6,913,552 B2 * | 7/2005 | Young | ................. | F16H 7/18 474/111 |
| 7,014,585 B2 | 3/2006 | Horikawa et al. | | |
| 7,163,479 B2 * | 1/2007 | Young | ................. | F16H 7/18 474/110 |
| 7,455,606 B2 * | 11/2008 | Markley | ................. | F16H 7/0848 474/109 |
| 7,479,077 B2 * | 1/2009 | Markley | ................. | F16H 7/08 474/101 |
| 7,513,843 B2 | 4/2009 | Markley et al. | | |
| 7,537,533 B2 * | 5/2009 | Wigsten | ................. | F16H 7/08 474/101 |
| 7,641,577 B2 * | 1/2010 | Markley | ................. | F16H 7/08 474/109 |
| 7,691,018 B2 | 4/2010 | Haesloop et al. | | |
| 8,387,244 B2 * | 3/2013 | Markley | ................. | F01L 1/022 123/90.31 |
| 8,715,122 B2 | 5/2014 | Young et al. | | |
| 9,206,886 B2 | 12/2015 | Young | | |
| 2002/0039941 A1 * | 4/2002 | Nakamura | ................. | F16H 7/08 474/111 |
| 2002/0045503 A1 * | 4/2002 | Young | ................. | F16H 7/08 474/111 |
| 2002/0069539 A1 * | 6/2002 | Tada | ................. | F16H 7/18 30/383 |
| 2002/0107097 A1 * | 8/2002 | Takeda | ................. | F16H 7/08 474/111 |
| 2002/0142872 A1 * | 10/2002 | Tada | ................. | F16H 7/18 474/111 |
| 2003/0064843 A1 | 4/2003 | Konno | | |
| 2003/0125144 A1 * | 7/2003 | Horikawa | ................. | F16H 7/08 474/111 |
| 2004/0005953 A1 * | 1/2004 | Yonezawa | ................. | F16H 7/08 474/111 |
| 2004/0132570 A1 * | 7/2004 | Takeda | ................. | F16H 7/08 474/111 |
| 2005/0090345 A1 * | 4/2005 | Garcia | ................. | F16H 7/08 474/111 |
| 2006/0025256 A1 * | 2/2006 | Wake | ................. | F16H 7/08 474/111 |
| 2006/0100048 A1 | 5/2006 | Wake et al. | | |
| 2006/0223661 A1 * | 10/2006 | Haesloop | ................. | F16H 7/08 474/111 |
| 2006/0234819 A1 * | 10/2006 | Markley | ................. | F16H 7/08 474/111 |
| 2007/0004544 A1 * | 1/2007 | Mishima | ................. | F16H 7/08 474/111 |
| 2007/0037647 A1 | 2/2007 | Markley et al. | | |
| 2009/0163311 A1 * | 6/2009 | Haesloop | ................. | F16H 7/08 474/111 |
| 2009/0197724 A1 | 8/2009 | Young | | |
| 2010/0210384 A1 * | 8/2010 | Young | ................. | F16H 7/08 474/111 |
| 2012/0035010 A1 * | 2/2012 | Young | ................. | F16H 7/08 474/111 |
| 2012/0052997 A1 * | 3/2012 | Young | ................. | F16H 7/08 474/111 |
| 2014/0162819 A1 * | 6/2014 | Young | ................. | F16H 7/08 474/111 |

OTHER PUBLICATIONS

Written Opinion dated May 31, 2016 for International application No. PCT/US2016/021376.
International Preliminary Report on Patentability dated Sep. 21, 2017 for International application No. PCT/US2016/021376.

* cited by examiner though somewhat less than ideal. As such, the blade assembly BAS' is in some cases inadequate in terms of stroke—stated differently, the stroke response is not sufficiently reactive or dynamic.

CHAIN TENSIONER PLASTIC BLADE WITH IMPROVED STRUCTURAL RIGIDITY AT THE SPRING-END REACTION SURFACES OF THE BLADE

CROSS-REFERENCE TO RELATED APPLICATION

This application claims priority from and benefit of the filing date of U.S. provisional patent application Ser. No. 62/130,414 filed Mar. 9, 2015, and the entire disclosure of said provisional application is hereby expressly incorporated by reference into the present specification.

BACKGROUND

The present invention relates generally to a mechanical blade-type chain tensioner for use in an automotive timing drive and, more particularly, to a plastic blade (shoe) member having improved structural rigidity at the spring reaction regions/features of the blade to in order to minimize deflections at these regions under maximum spring loading, thereby affording a greater level of dynamic stability for the blade and spring assembly during high speed engine operation.

FIGS. 1 & 2 show an exemplary known blade-type tensioner T' that is particularly suited for use in confined spaces. The tensioner T' comprises a blade assembly BAS' operatively connected to a support bracket K. The blade assembly BAS' comprises a metal leaf spring S that is mechanically interlocked with a polymeric (plastic) shoe or blade B' for applying a tensioning force to the slack strand segment 17 of a chain 15. The spring S is typically formed as a leaf spring from a generally rectangular one-piece strip of spring steel that is formed to have an arched shape. The spring S can alternatively comprise a nested stack of leaf springs. The bracket K includes a pivot pin (PIN) that projects outwardly from a main wall MW, and a first or pivot end B1' of the blade assembly BAS' includes a pivot barrel BL' in which is defined a pivot bore PB' that receives the pivot pin PIN for reciprocating clockwise/counter-clockwise pivoting or angular movement of the blade assembly BAS' about the pin PIN. The bracket K also includes a ramp R that also projects from its main wall MW, and an opposite, second or free end B2' of the blade assembly BAS' is supported on the ramp R for reciprocal sliding movement. The blade B' also includes a central segment or portion B3' that extends between and connects the first and second ends B1',B2', and an outside surface OS' of the central portion B3' provides a chain contact surface adapted to be slidably engaged by the associated chain 15 being tensioned. The bracket K thus maintains the blade assembly BAS' in its proper position with respect to the plane of the chain path while permitting sliding reciprocal translational motion of the second, free end B2' on the ramp R as indicated by the arrow "TRANS" along with the related rotational movement of the blade assembly BAS' at the pivot end B1' as indicated by the arrow labeled "ROTATE" in response to changes in the tension and position of the slack strand 17 of the chain 15 and corresponding oscillatory movement of the slack strand 17 and blade central portion B3' as indicated by the arrow "AMPL."

FIG. 2 illustrates the tensioner T' secured to an associated engine block EB as part of the timing drive system and is shown in contact with a slack strand of a new (unworn) timing chain 15. The preferred orientation of the outside surface OS' of the blade central portion B3' with respect to the slack strand segment 17 of the new chain 15 is for the chain contact length to be substantially centered at a midpoint of the central blade segment B3' which also defines and is aligned with the midpoint $S_{MP}$ of the spring S (see also FIG. 3). Referring to FIG. 2A, the blade assembly BAS' is shown at its full working travel position in contact with a max elongated (worn) chain 15. This full working travel operative position for the blade assembly BAS', shown in solid lines, is overlaid with the blade assembly (in phantom lines) at its initial operative position with a new chain 15.

With reference also to FIG. 3, the first and second ends B1',B2' of the blade define respective first and second spring-receiving slots SL1',SL2' for respectively receiving and retaining first and second opposite ends S1,S2 of the spring S. The blade central portion B3' includes a lower or inner surface IS' that is defined by the underside of the central portion B3' that is opposite the outer surface OS'. The inner surface IS' is contacted by an arched central portion S3 of the spring S. As such, the first and second spring-receiving slots SL1',SL2' and the inner surface IS' of the blade central portion B3' define a spring-receiving slot or region that opens through the opposite front and rear faces FF',RF' of the blade B'. The axial retention of the spring S to the blade B' is achieved with the walls W1',W2' at the front face FF' side of the blade and the retaining tabs T1',T2' at the rear face RF' side, but this arrangement can be reversed. In particular, the first end S1 of the spring S is retained in the first slot SL1' between a first side wall W1' and a first installation tab T1', and the second end S2 of the spring S is retained in the slot SL2' between a second side wall W2' and a second installation tab T2'. The wall and retaining tab configuration and method of spring installation for the blade assembly BAS' is disclosed in Young, U.S. Pat. No. 9,206,886, the entire disclosure of which is hereby expressly incorporated into the present specification. The walls W1',W2' and retaining tabs T1',T2' are shown in FIG. 3, but are omitted from some of the other figures for clarity in illustrating the underlying features.

With continuing reference to FIG. 3, the blade assembly BAS' is shown at its initial operative position for a new (shortest) chain 15. A first end wall E1' of the blade B' extends transversely between and connects the first lower wall LW1' to the blade central portion B3' and closes the first slot SL1' at the first end B1' of the blade B'. Similarly, a second end wall E2' of the blade B' extends transversely between and connects the second lower wall LW2' to the blade central portion B3' and closes the second slot SL2' at the second end B2' of the blade B'. The opposite first and second ends S1,S2 of the spring S are respectively located in the first and second slots SL1',SL2', and the first and second spring ends S1,S2 respectively include first and second linear edges SE1,SE2 (see also FIGS. 3E & 3F) that are seated in line contact with the respective lower slot wall surfaces LW1',LW2' at respective first and second contact positions or contact locations 10,12 as defined by the effective spring length $L_E$. The arched central portion S3 of the spring contacts the underside or inner surface IS' of the central portion B3' of blade B'.

The purpose of a chain tensioner T' for an automotive timing drive system is to provide a sufficient tensioning force to the slack chain strand 17 in order to properly control the transverse chain motion and the torsional vibrations resulting from the loading and torsional inputs such as the valve events at the camshaft and the firing pulses at the crankshaft. These firing engine dynamic inputs will generally cause the tensioner blade assembly to stroke dynamically—but in a controlled manner if the device is properly engineered for the engine. The tensioner must also have sufficient take-up capability as the chain wears and elongates in service in order to continue to properly control the chain strand at the elongated (worn) chain lengths.

The blade assembly BAS' in FIG. 3A is shown at its initial operative position as it would be positioned when a slack strand chain segment 17 of a new chain is in contact with the outer surface OS' of the central blade segment B3' at the spring midpoint $S_{MP}$ (see also FIG. 2 for a corresponding view that also shows the chain strand 17). FIG. 3D shows the spring S by itself in the initial operative position corresponding to FIG. 3A, and it can be seen that the spring S defines a height h1 relative to the reference line of length $L_E$ connecting the first and second edges SE1,SE2 of the spring (i.e., the reference line connects the contact locations 10,12).

With continuing reference to FIG. 3A, a free body diagram of the blade assembly BAS' at its initial operative position is shown and with the system in equilibrium, a summation of the force vectors acting on the blade assembly will equal zero. The blade assembly will exert a force $SF_{MAX}$ against the chain strand as a function of the deflected height of the tensioner spring S and the chain strand 17 will exert an equal and opposite force $CF_{MAX}$ against the blade outer surface OS'. The chain tensioning force for a known prior art tensioner at the new chain position is 20 lbs. The force vectors acting on the blade, shown with solid black fill, are the vertical chain force $CF_{MAX}$ acting against the outer blade surface OS' at the blade midpoint, the bracket ramp force $F_R$ acting at a free end B2' of the blade against the blade foot BF' at the contact location 14 normal to the ramp surface R at an angle θ with respect to a reference line $L_{REF2}$ oriented normal to the line of length $L_E$ that connects the opposite edges SE1,SE2 of the spring S (the θ reference line $L_{REF2}$ is vertically oriented in the illustrated example), and the bracket pivot pin force $F_P$ acting at the pivot end of the blade against the inside diameter of the blade pivot bore PB' through its center or axis of rotation P' at contact location 18 and also at an angle θ relative to a reference line $L_{REF1}$ also oriented normal to the line of length $L_E$ to cancel out the horizontal components of the force vectors $F_R,F_P$. The summation of the external force vectors acting on the blade equal zero, and the force vectors $F_R,F_P$ are substantially equal. Similarly, the spring force vectors $SF_{MAX},SF_R,SF_P$, shown with crosshatch fill, act internal to the blade B' and the summation of these force vectors also equals zero. The spring force vectors $SF_P$ and $SF_R$ act on the slot lower walls LW1',LW2' at the respective contact locations 10,12 where the first and second spring edges SE1,SE2 contact the lower walls LW1',LW2'.

FIG. 3B is an enlarged partial view of the FIG. 3A blade at the free end ramp and FIG. 3C is an enlarged partial view of the FIG. 3A blade at the pivot end. As shown in FIG. 3B, the force vectors $SF_R$ and $F_R$ are offset with respect to each other by a distance or moment arm $d_R'$ at the blade free end B2' due to a corresponding offset between the contact locations 12 and 14. Similarly, as shown in FIG. 3C, the force vectors $SF_P$ and $F_P$ are offset with respect to each other by a distance or moment arm $d_P'$ at the blade pivot end B1' due to a corresponding offset between the contact locations 10 and 18. These moment arm offsets $d_P',d_R'$, will produce or result in a repeated deflection of the lower wall surfaces LW1',LW2' of the first and second spring-receiving slot SL1',SL2' toward the surface IS' of the blade central portion B3' during engine operation, which is believed to have an adverse effect including relative motion between the spring edges SE1,SE2 and the respective lower walls LW1',LW2' which can result in abrasion of the lower walls LW1',LW2' and/or undesired longitudinal motion of the spring S toward and away from the first and second end walls E1',E2'.

The camshaft and crankshaft torsional vibrations promote excessive chain drive dynamics at the higher engine speeds, particularly at 5,000 rpm and above, resulting in greater slack strand chain oscillatory motion along with an associated maximum blade assembly transverse motion (AMPL) for a given chain length. The amount of AMPL is a function of the chain length and AMPL increases with chain wear elongation.

The moment arm offsets $d_P',d_R'$ are a major contributor to lower wall deflection and this deflection is largest at the higher tensioner loads during high speed engine operation. This deflection at high speeds is believed to result in a high frequency flexing of the lower wall surfaces LW1',LW2' as the blade and spring assembly motion AMPL cycles between the minimum operative tensioner loading position shown in FIG. 4 and the maximum operative tensioner loading position shown in FIG. 3A. It should be noted that the FIG. 4 position represents the max AMPL motion with a max worn (elongated) chain length but the detrimental flexing will still occur with a shorter worn chain. It is also important to note that the high frequency flexing results from the change in deflection or "delta" deflection between the two positional limits at high engine speed and it is believed to facilitate a partial unseating or floating of the springs ends SE1,SE2 relative to the lower wall surfaces LW1',LW2', thereby initiating relative longitudinal motion between the spring ends and the lower wall contact surfaces to cause the blade failure mode of end wall fracture as the spring slices its way through one or the other of the end walls E1',E2'. This failure has been shown to occur at the blade end where there is excessive lower wall deflection during high speed operation.

Finite element analysis (FEA) and engine testing support the premise that the lower wall flexing during high speed engine operation will facilitate a cutting or slicing action by the spring ends SE1,SE2 at the end walls E1',E2' by initiating relative longitudinal motion between the spring ends SE1,SE2 and the lower wall surfaces LW1',LW2'. This end wall cutting action occurs as the blade flattens out at the max loading blade position.

FIG. 3E shows that the spring S has variable heights h1,h2,h3 depending upon its operative state, with corresponding variations in the straight-line distance between its first and second edges SE1,SE2. FIG. 3F provides a bottom view of the spring S at height h1. The spring S has a free height h3 when unconstrained as in a free state. The height h1 corresponds to the height of the spring S for the initial operative position of the blade assembly BAS' with a new chain 15 in which the spring defines the distance $L_E$ between its ends. The height h2 is equal to the height of the spring S when the blade assembly BAS' is at its full working travel position in contact with a max elongated (worn) chain 15, at which condition the straight-line distance between the spring edges SE1,SE2 is reduced to $L_E FT$ which is less than $L_E$. Testing has shown that when the blade assembly BAS' is used in an engine with a worn chain, the blade assembly will oscillate between the FIG. 3A and FIG. 4 positions, corresponding to changes in the spring height from h1 to h2, and this magnitude of spring height change is referred to herein as the working travel WT of the spring S.

FIG. 4 shows that, as the chain 15 wears and the slack strand 17 lengthens to its maximum design length, the blade assembly BAS' will move to its full travel operative position corresponding to the spring height h2 and the distance $L_E FT$ defined between the spring edges SE1,SE2. Because the pivot axis P' about which the pivot end of the blade assembly BAS' rotates is fixed, the blade assembly BAS' must rotate about the pivot axis P' slightly (clockwise in FIG. 4) as the chain lengthens and the spring height increases from h1 to h2. The contact location 14 of the blade foot BF' on the ramp R shifts to contact location 14FT on the ramp R, as the blade assembly BAS' rotates. To further illustrate the rotation of the blade assembly BAS', the FIG. 3 (new chain) positions for the first and second spring contact locations 10,12 in the slots SL1',SL2' are also shown in FIG. 4 using broken leader lines. In FIG. 4, a free body diagram of the blade assembly BAS' is shown at its full travel operative position and with the system in equilibrium, a summation of the force vectors acting on the blade assembly will equal zero. The blade assembly BAS' will exert a force $SF_{FT}$ against the chain strand as a function of the deflected height of the tensioner spring S and the chain strand 17 will exert an equal and opposite force $CF_{FT}$ against the blade outer surface OS'. The chain tensioning force for a known prior art tensioner at this max length worn chain position is 10 lbs. The force vectors acting on the blade, shown with solid black fill, are the chain force $CF_{FT}$ acting against the outer blade surface OS' at the blade midpoint, the bracket ramp force $F_R$FT acting at a free end of the blade against the blade foot BF' at the contact location 14FT normal to the ramp surface R at an angle β' with respect to the reference line $L_{REF2}$ oriented normal to the line of length $L_E$FT that connects the opposite edges SE1,SE2 of the spring S, and the bracket pivot pin force $F_P$FT acting at a pivot end of the blade against the inside diameter of the blade pivot bore PB' through its pivot axis/center P' at contact location 18FT and also at an angle β' to cancel out the horizontal components of the force vectors $F_R$FT,$F_P$FT. The summation of the external force vectors acting on the blade equal zero, and the force vectors $F_R$FT,$F_P$FT are substantially equal. Similarly, the spring force vectors $SF_{FT}$,$SF_R$FT,$SF_P$FT, shown with crosshatch fill, act internal to the blade B' and the summation of these force vectors also equals zero. The spring force vectors $SF_P$FT and $SF_R$FT act on the slot lower walls LW1',LW2' at the respective first and second contact locations 10,12.

FIG. 4A is an enlarged partial view of the FIG. 4 blade at the free end ramp and FIG. 4B is an enlarged partial view of the FIG. 4 blade at the pivot end. As shown in FIG. 4A, the force vectors $SF_R$FT and $F_R$FT remain offset with respect to each other by a distance or moment arm $d_R$FT' at the blade free end due to a corresponding offset between the contact locations 12 and 14FT. Similarly, as shown in FIG. 4B, the force vectors $SF_P$FT and $F_P$FT are offset with respect to each other by a distance or moment arm $d_P$FT' at the blade pivot end due to a corresponding offset between the contact locations 10 and 18FT. These offsets $d_P$FT',$d_R$FT' are believed to produce or result in a repeated deflection of the lower wall surfaces LW1',LW2' of the first and second spring-receiving slot SL1',SL2' toward the inner surface IS' during engine operation which is believed to have an adverse effect as described above for the offsets $d_P$',$d_R$', although the force vectors $F_R$FT and $F_P$FT each have a reduced magnitude relative to the respectively corresponding force vector $F_R$,$F_P$ for the FIG. 3A initial operative position for a new chain 15.

SUMMARY

In accordance with a first aspect of the present development, a chain tensioner comprises a bracket including a main wall, a ramp that projects outwardly from the main wall, and a pin connected to and projecting outwardly from the main wall. A blade assembly is operatively connected to the bracket. The blade assembly includes a polymeric blade comprising a first end, a second end, and a central portion that extends between the first end and the second end. The central portion includes: (i) an outer surface adapted for being slidably engaged by an associated chain; and, (ii) an inner surface located on an opposite side of the central portion relative to the outer surface. A pivot bore is defined about a pivot axis in the first end of the blade, and a foot is located at the second end of the blade. A first spring-receiving slot located in the first end of the blade, the first spring-receiving slot located between the inner surface and a first lower wall that is spaced from the inner surface. A second spring-receiving slot is located in the second end of the blade. The second spring-receiving slot is located between the inner surface and a second lower wall that is spaced from the inner surface. A spring includes a first end located in the first spring-receiving slot, a second end located in the second spring-receiving slot, and a central portion located between the first and second spring ends and in contact with the inner surface of the blade central portion. The first end of the spring is in contact with the first lower wall at a first contact location and the second end of the spring in contact with the second lower wall at a second contact location such that a pivot end spring force vector $SF_P$ acts on the first lower wall at the first contact location and a free end spring force vector $SF_R$ acts on the second lower wall at the second contact location. The tensioner blade assembly is mounted on the bracket with the pin located in the pivot bore and with the foot of the blade supported on said ramp. A pivot pin force vector $F_P$ acts on an inside diameter of the pivot bore through the pivot axis. A ramp force vector $F_R$ acts on the blade foot at a ramp contact location where the blade foot contacts the ramp. The ramp force vector $F_R$ and the free end spring force vector $SF_R$ are aligned and coincident with each other.

In accordance with another aspect of the present development, a chain tensioner system comprises a bracket including a main wall, a ramp that projects outwardly from the main wall, and a pin connected to and projecting outwardly from the main wall. A blade assembly is operatively connected to the bracket. The blade assembly includes a polymeric blade comprising a first end, a second end, and a central portion that extends between the first end and the second end. The central portion includes: (i) an outer surface adapted for being slidably engaged by an associated chain; and, (ii) an inner surface located on an opposite side of said central portion relative to the outer surface. A pivot bore is defined about a pivot axis in the first end of the blade, and a foot is located at the second end of the blade. A first spring-receiving slot is located in the first end of the blade, the first spring-receiving slot located between the inner surface and a first lower wall that is spaced from the inner surface. A second spring-receiving slot is located in the second end of the blade, the second spring-receiving slot located between the inner surface and a second lower wall that is spaced from the inner surface. A spring includes a first end located in the first spring-receiving slot, a second end located in the second spring-receiving slot, and a central portion located between the first and second spring ends and in contact with the inner surface of the blade central portion. The first end of the spring is in contact with the first lower wall at a first contact location and the second end of the spring is in contact with the second lower wall at a second contact location such that a pivot end spring force vector $SF_P$ acts on the first lower wall at the first contact location and a free end spring force vector $SF_R$ acts on the second lower wall at the second contact location. A chain is in contact with the outer surface of the blade and exerts a chain force against the outer surface of the blade. The tensioner blade assembly is mounted on the bracket with the pin located in the pivot bore and with the foot of the blade supported on the ramp. A pivot pin force vector $F_P$ acts on an inside diameter of the pivot bore through the pivot axis. A ramp force vector $F_R$ acts on the blade foot at a ramp contact location wherein the blade foot contacts the ramp. The ramp force vector $F_R$ and the free end spring force vector $SF_R$ are aligned and coincident with each other.

In accordance with a further aspect of the present development, a blade assembly for a chain tensioner comprises a polymeric blade including a first end, a second end, and a central portion that extends between the first end and the second end. The central portion comprises: (i) an outer surface adapted for being slidably engaged by an associated chain; and, (ii) an inner surface located on an opposite side of the central portion relative to the outer surface. A pivot bore is defined about a pivot axis in the first end of the blade. A foot is located at the second end of the blade and comprises an outer surface adapted to engage an associate support surface. A first spring-receiving slot is located in the first end of said blade. The first spring-receiving slot is located between the inner surface and a first lower wall that is spaced from the inner surface. A second spring-receiving slot is located in the second end of the blade. The second spring-receiving slot is located between the inner surface and a second lower wall that is spaced from the inner surface. A spring includes a first end located in the first spring-receiving slot, a second end located in the second spring-receiving slot, and a central portion located between the first and second spring ends and in contact with the inner surface of the blade central portion. The first end of said spring is in contact with the first lower wall at a first contact location and the second end of the spring is in contact with the second lower wall at a second contact location. The outer surface of the foot of the blade comprises a cylindrical arc segment defined by a radius having its arc center located at the second contact location where the second end of the spring contacts the second lower wall.

DETAILED DESCRIPTION

Figure 5:
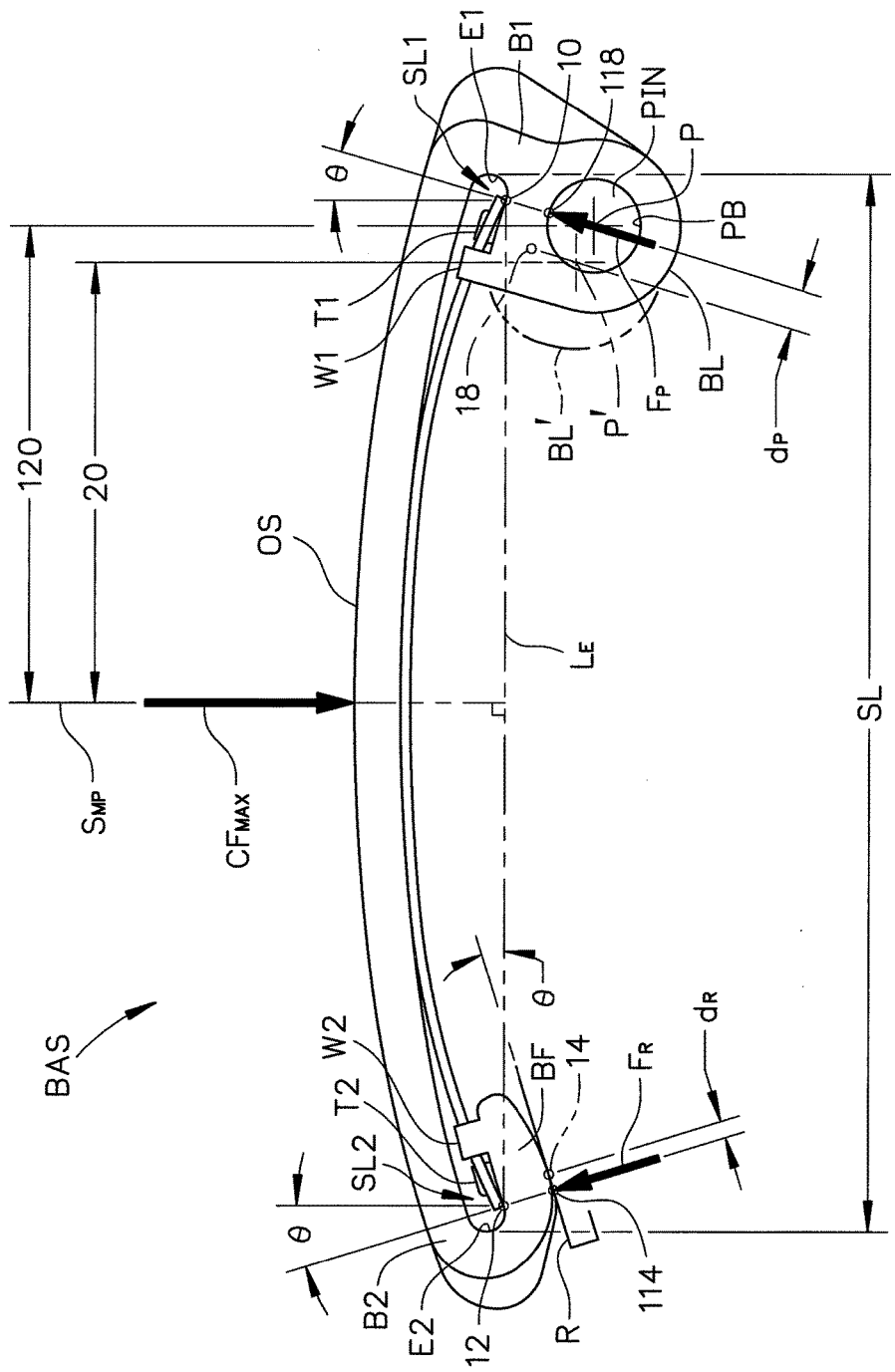
FIG. 5 is a front view of a blade assembly portion of a chain tensioner formed in accordance with the present development.
Figure 6:
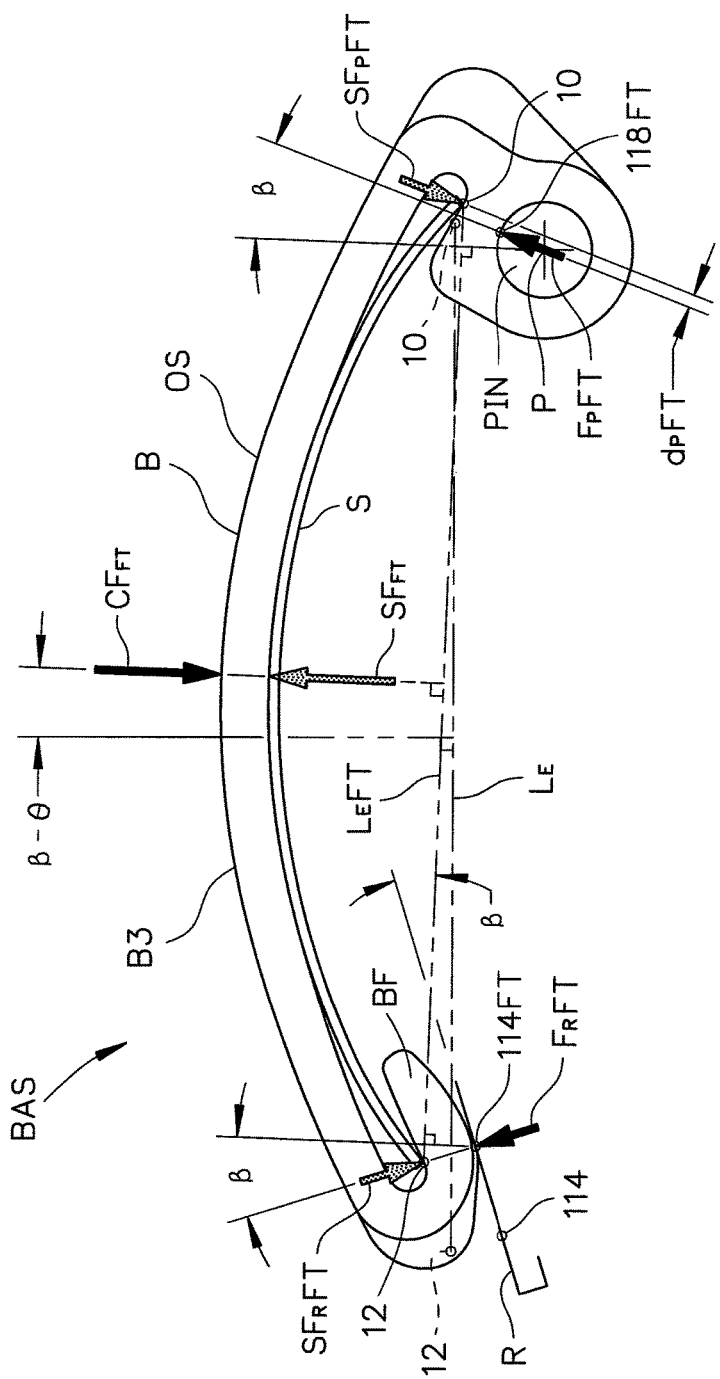
FIG. 6 is similar to FIG. 5A but shows the blade assembly in its full travel position as would occur in association with a worn (elongated) chain.
Figure 6B:
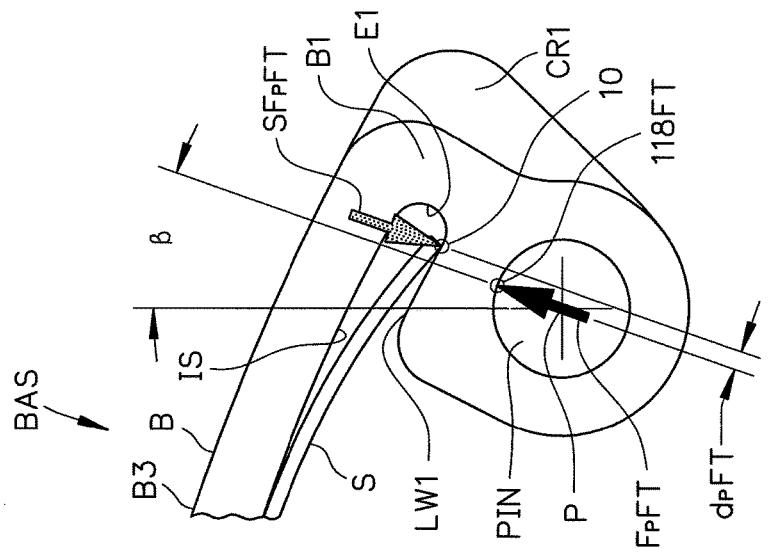
FIGS. 6A & 6B are enlarged views of the free end and pivot end, respectively, of the FIG. 6 blade assembly.

FIGS. 5-6B show a blade assembly BAS that is identical to the blade assembly BAS' shown in FIGS. 1-4B, except as otherwise shown and/or described herein. In particular, the new blade assembly BAS of FIGS. 5-6B as described below in accordance with the present development is operatively assembled to the bracket K or a similar mounting structure to provide a tensioner T for an engine timing drive system such as that shown in FIG. 2 that is otherwise structurally and functionally identical to the tensioner T' except for the differences between the blade assembly BAS' of FIGS. 1-4B and the blade assembly BAS of FIGS. 5-6B as shown and/or described herein. Certain common features between the blade assembly BAS' and the present blade assembly BAS are identified with like reference characters omitting the primed (') designation and are not described again here. The leaf spring S used for the blade assembly BAS is identical to that used for the blade assembly BAS', but the present development is not to be limited to any particular spring force such as those described above.

FIG. 5 shows the blade assembly BAS at its initial operative position for a new (shortest possible) chain 15. The spring S is centered between respective outermost end walls E1,E2 of first and second slots SL1,SL2, and the first and second spring edges SE1,SE2 are respectively seated in line contact with the respective lower slot wall surfaces L1N1,LW2 at positions 10,12 as defined by the effective spring length $L_E$ being the straight-line distance between the opposite first and second edges SE1,SE2 of the spring S. The arched central portion S3 of the spring S contacts the underside or inner surface IS of the central portion B3 of blade B. The spring S can comprise a nested stack of leaf springs.

Figure 1:
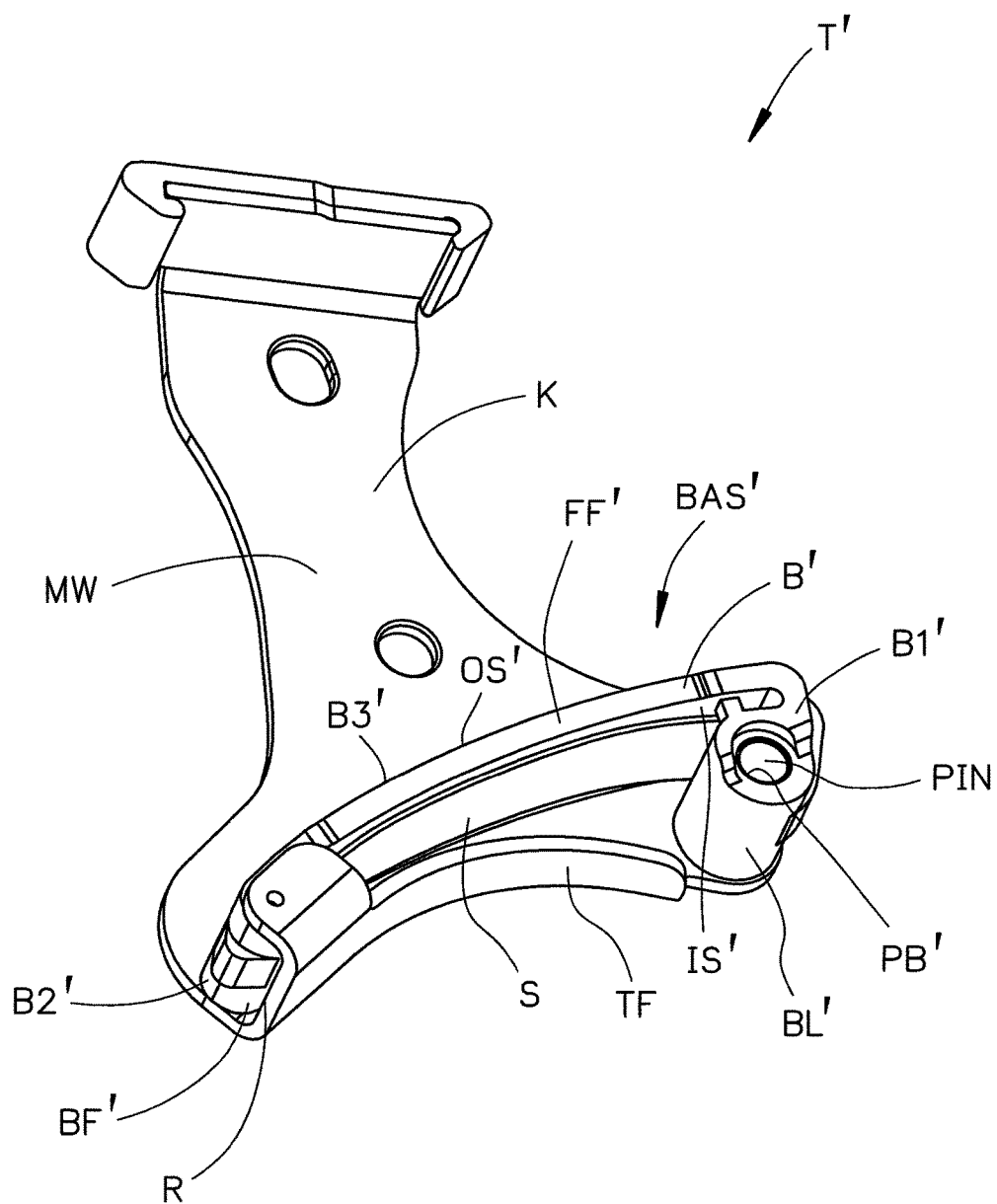
FIG. 1 shows an exemplary known blade-type chain tensioner for an automotive or similar timing drive system.
Figure 2:
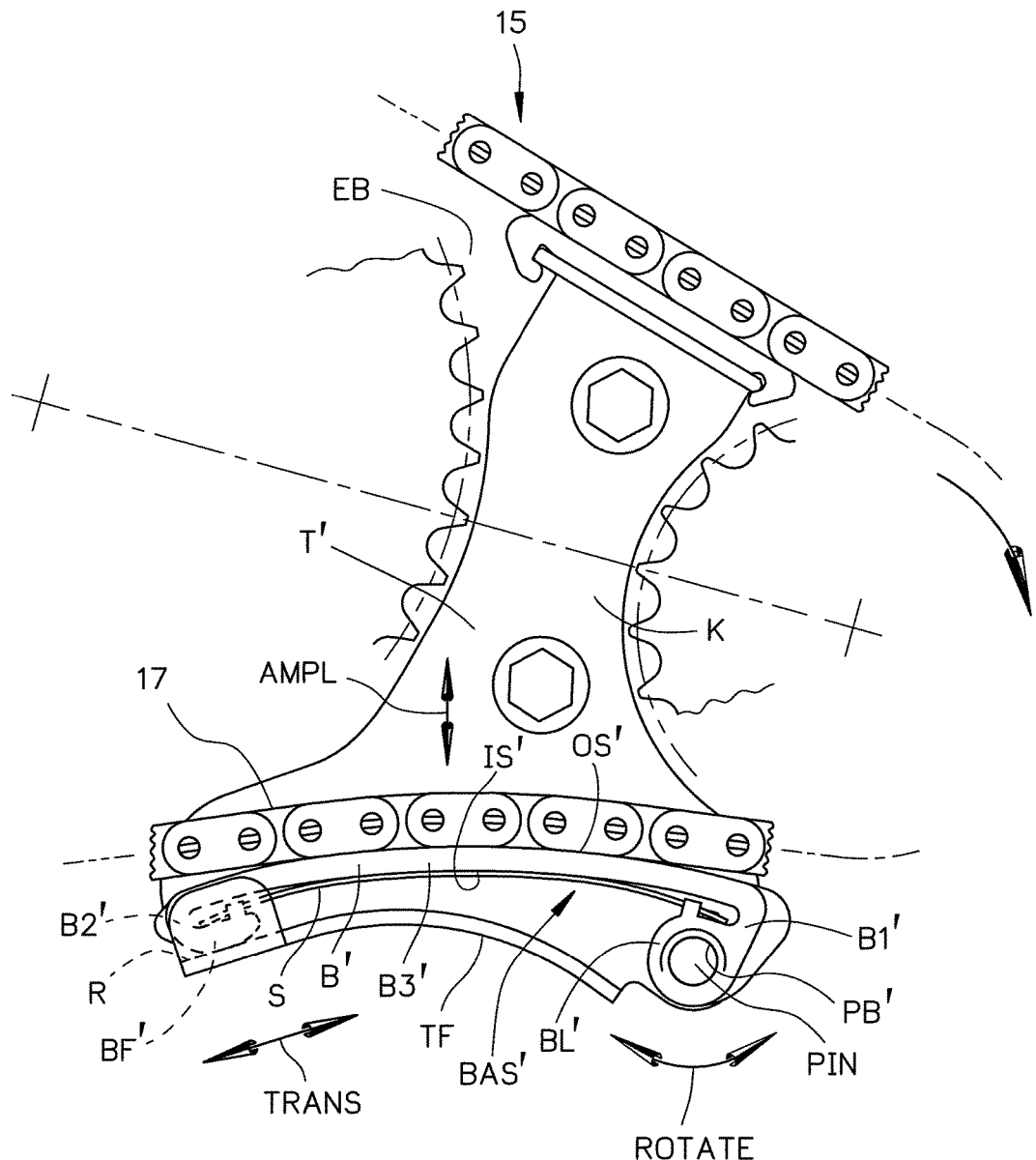
FIG. 2 illustrates the tensioner of FIG. 1 secured to an associated engine block as part of a timing drive system and is shown in contact with a new timing chain.
Figure 2A:
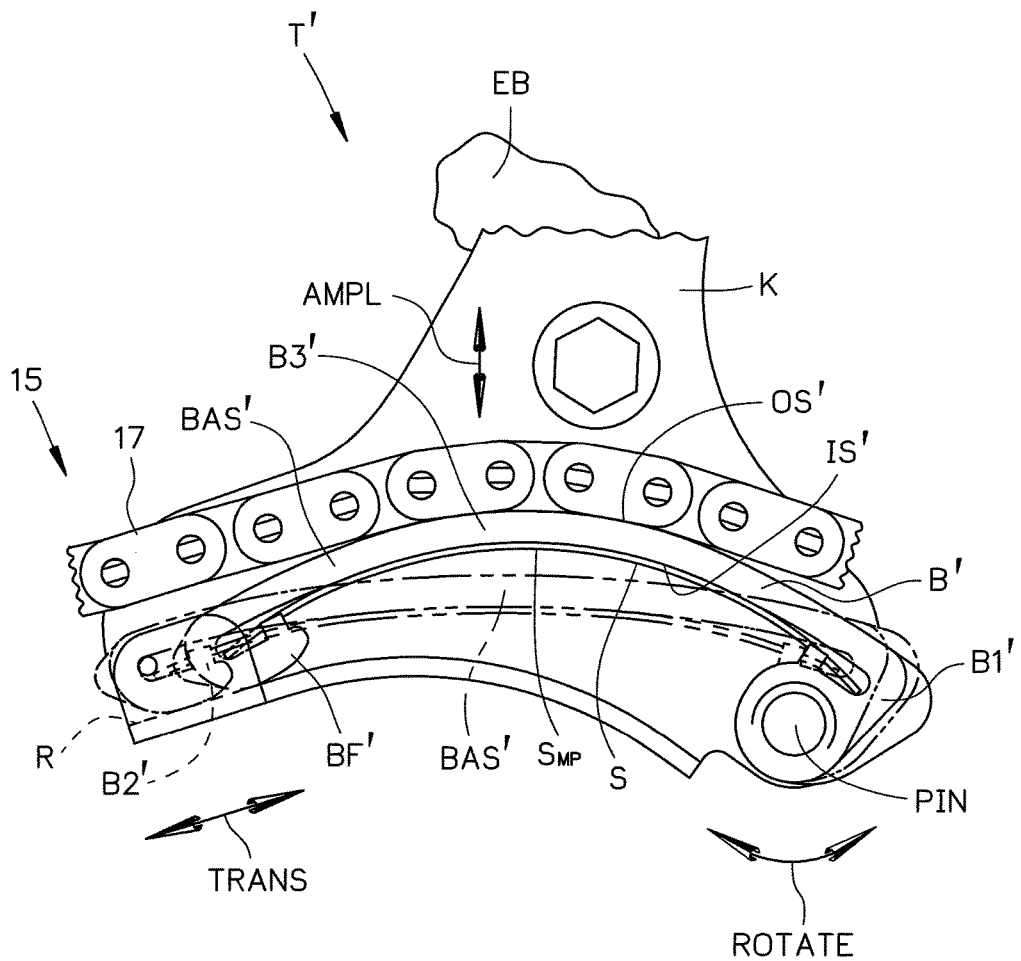
FIG. 2A is a partial view that is similar to FIG. 2 but shows the blade assembly at its full working travel position in contact with a max elongated (worn) chain.
Figure 3:
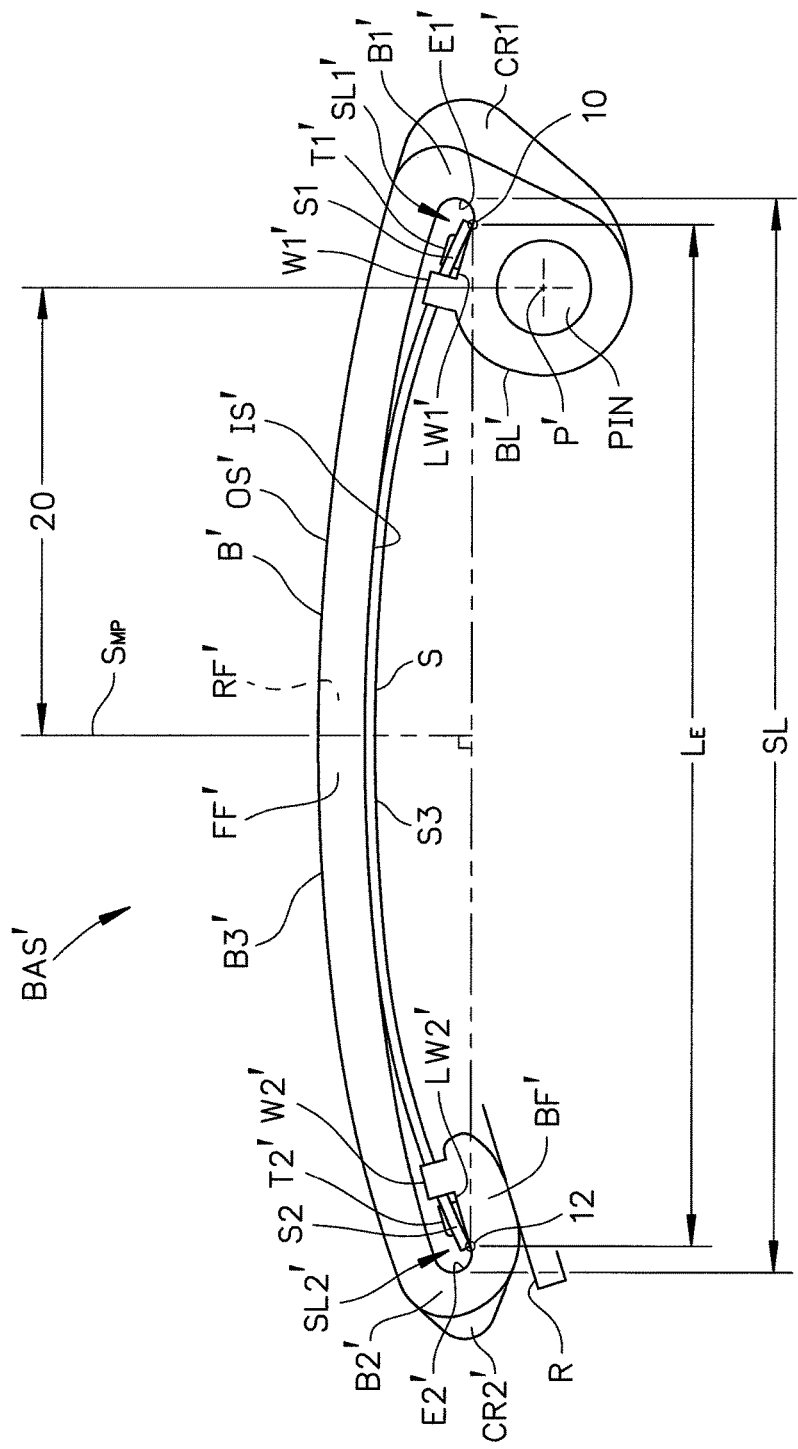
FIG. 3 is a front view of the blade assembly portion of the chain tensioner.
Figure 3A:
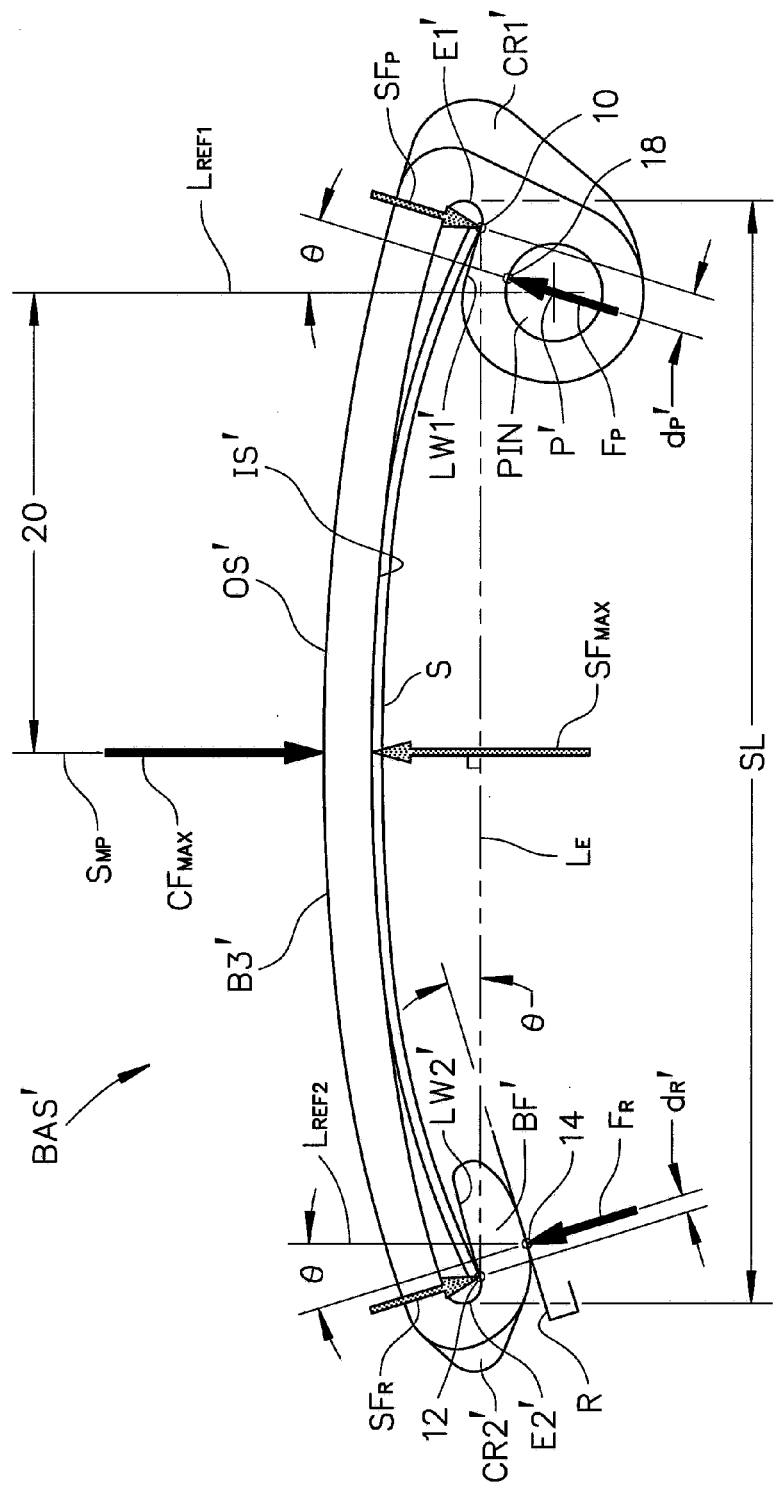
FIG. 3A is similar to FIG. 3, with portions of the blade assembly removed for clarity, showing a free body diagram with the system in equilibrium.
Figure 3B:
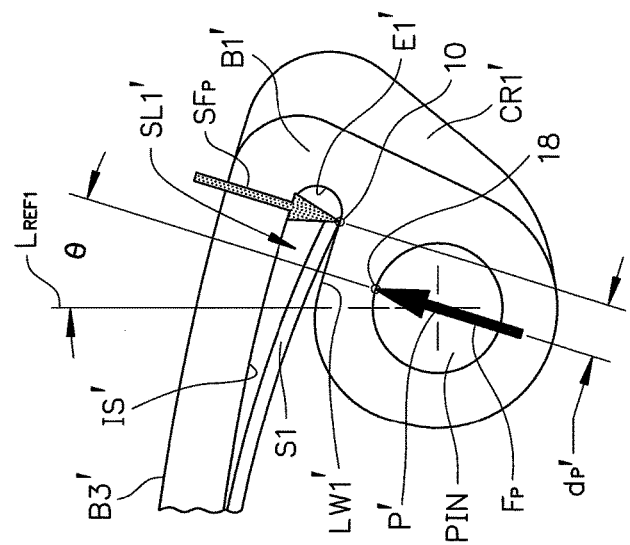
FIGS. 3B & 3C are enlarged views of the free end and the pivots end, respectively, of the FIG. 3A blade assembly.
Figure 3C:
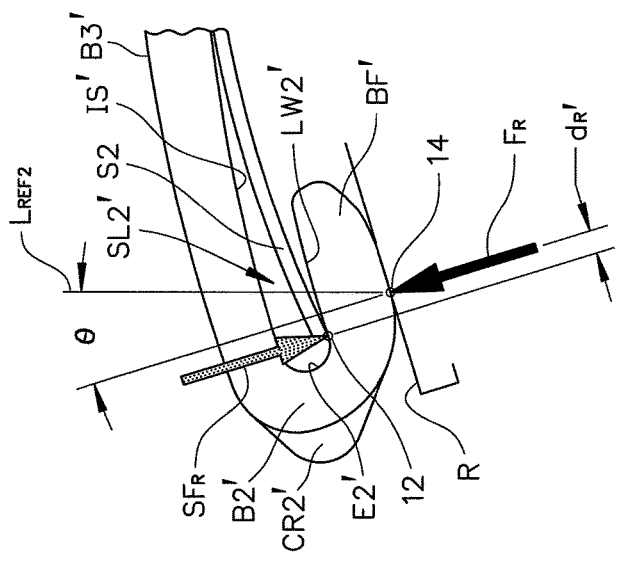
Figure 3D:
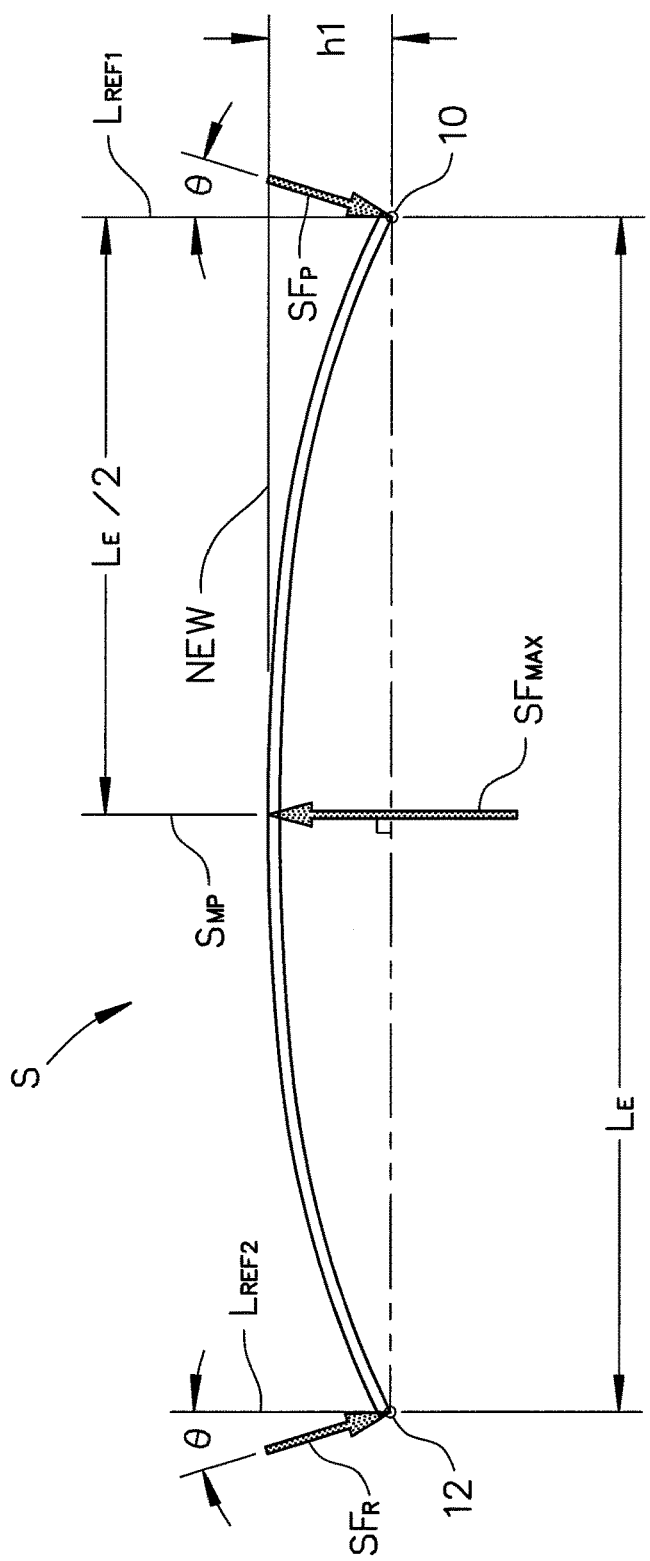
FIG. 3D is a front view of the leaf spring portion of the blade assembly.

FIG. 5 shows a partial view of the pivot end barrel BL' of the prior art blade assembly BAS' in phantom lines, and it can be seen that a main distinction between the blade assembly BAS' and the new blade assembly BAS is that the barrel BL, pivot bore PB and pivot axis P for the new blade B are shifted outward relative to the midpoint $S_{MP}$ of the spring S for reasons described below. As shown in FIG. 5, the prior art pivot axis P' is spaced a distance 20 from the spring midpoint $S_{MP}$, while the new pivot axis P is spaced a greater distance 120 from the spring midpoint $S_{MP}$. As such, pivot bore contact location 18 for prior art blade B' is shifted outward by a distance $d_P$ to a new pivot bore contact location 118 for the new blade B. Likewise, the opposite, free end B2 of the blade B is altered relative to the free end B2' of the known blade B' to shift the contact point of the blade foot BF with the ramp R outward with respect to the spring midpoint $S_{MP}$ from location 14 for the blade B' to a new location 114 for the blade B, the distance between 14 and 114 on the ramp indicated by $d_R$. Those of ordinary skill in the art will recognize that the distance $d_R$ by which the contact location 14 is shifted to contact location 114 for the present blade assembly BAS equals the undesired offset distances $d_R'$ for the known blade assembly BAS' as described above in relation to FIG. 3A such that $d_R'=d_R$. Likewise, the distance $d_P$ by which the contact location 18 is shifted to contact location 118 for the present blade assembly BAS equals the undesired offset distances $d_P'$ for the known blade assembly BAS' as described above in relation to FIG. 3A such that $d_P'=d_P$.

Figure 5A:
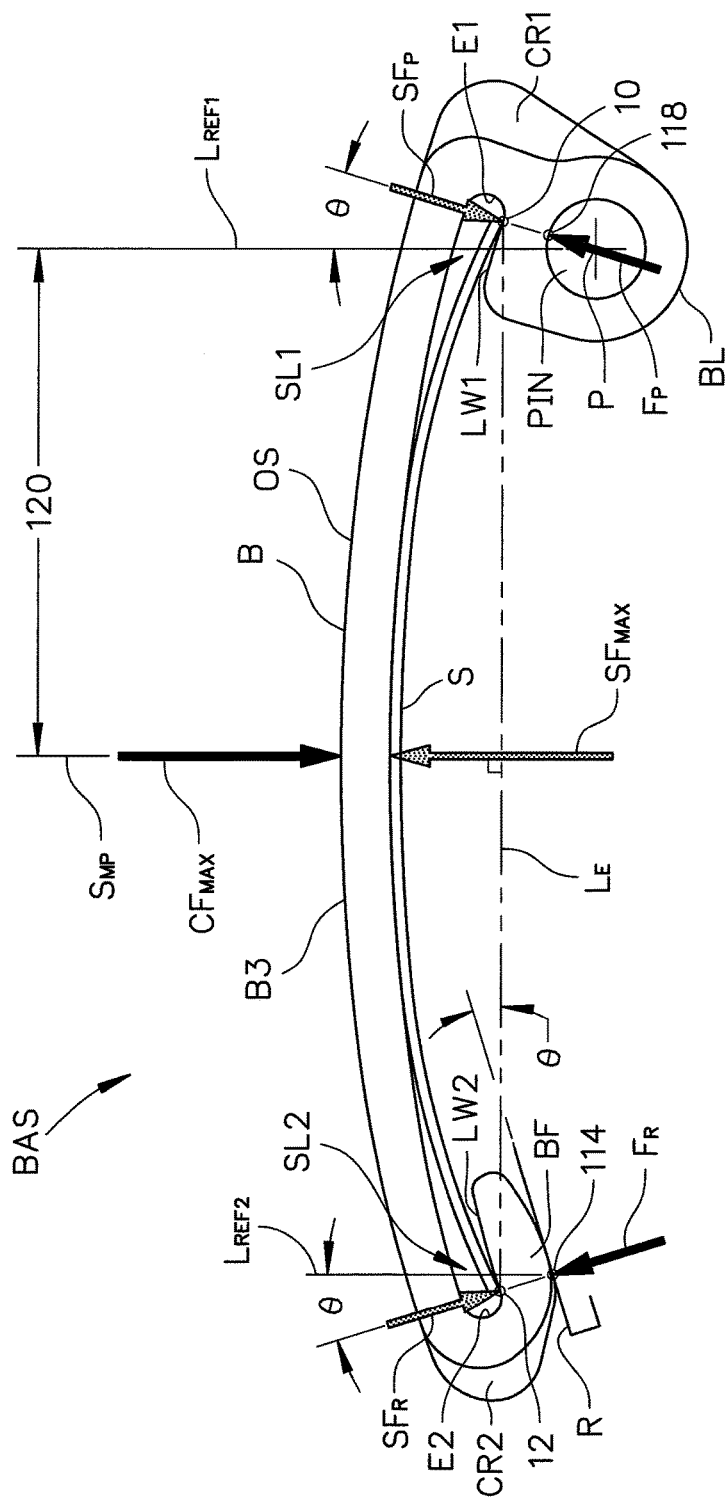
FIG. 5A is similar to FIG. 5, with portions of the blade assembly removed for clarity, showing a free body diagram with the system in equilibrium.

FIG. 5A is similar to FIG. 5, but the spring-retaining walls & tabs W1,T1,W2,T2 are omitted to simplify the drawing. The blade assembly BAS in FIG. 5A is shown at its initial operative position for a new chain and, in use, will have a chain segment (not shown) in contact with the outer surface OS of the central blade segment B3 at a location corresponding to and substantially aligned with the spring midpoint $S_{MP}$, with the spring midpoint $S_{MP}$ being located halfway between the opposite first and second ends SE1,SE2 of the spring at a distance spaced linearly $L_E/2$ from each spring end SE1,SE2. The system BAS is in equilibrium and a summation of the force vectors acting on the blade assembly will equal zero. The blade assembly will exert a force $SF_{MAX}$ against the chain strand as a function of the deflected height of the tensioner spring S and the chain strand 17 will exert an equal and opposite force $CF_{MAX}$ against the blade outer surface OS. In one embodiment, the chain tensioning force at the new chain position is 20 lbs. The force vectors acting on the blade, shown with solid black fill, are the vertical chain force $CF_{MAX}$ acting against the outer blade surface OS at the blade midpoint, the bracket ramp force $F_R$ acting at a free end of the blade against the blade foot BF at the contact location 114 normal to the ramp surface R at an angle θ with respect to the reference line $L_{REF2}$ arranged normal to the line of length $L_E$ that connects the opposite first and second edges SE1,SE2 of the spring S (the 8 vertical reference line is vertically oriented in the illustrated example), and the bracket pivot pin force $F_P$ acting at a pivot end of the blade against the inside diameter of the blade pivot bore PB through its center or pivot axis P at contact location 118 and also at an angle θ with respect to the reference line $L_{REF1}$ that extends normal to the line of spring length $L_E$ to cancel out the horizontal components of the force vectors $F_R,F_P$. The force vectors $F_R,F_P$ are substantially equal. Similarly, the spring force vectors $SF_{MAX}$, $SF_R,SF_P$, shown with crosshatch fill, act internal to the blade B and the summation of these force vectors also equals zero. The spring force vectors $SF_P$ and $SF_R$ act on the slot lower walls LW1,LW2 at the respective contact locations 10,12.

Figure 5C:
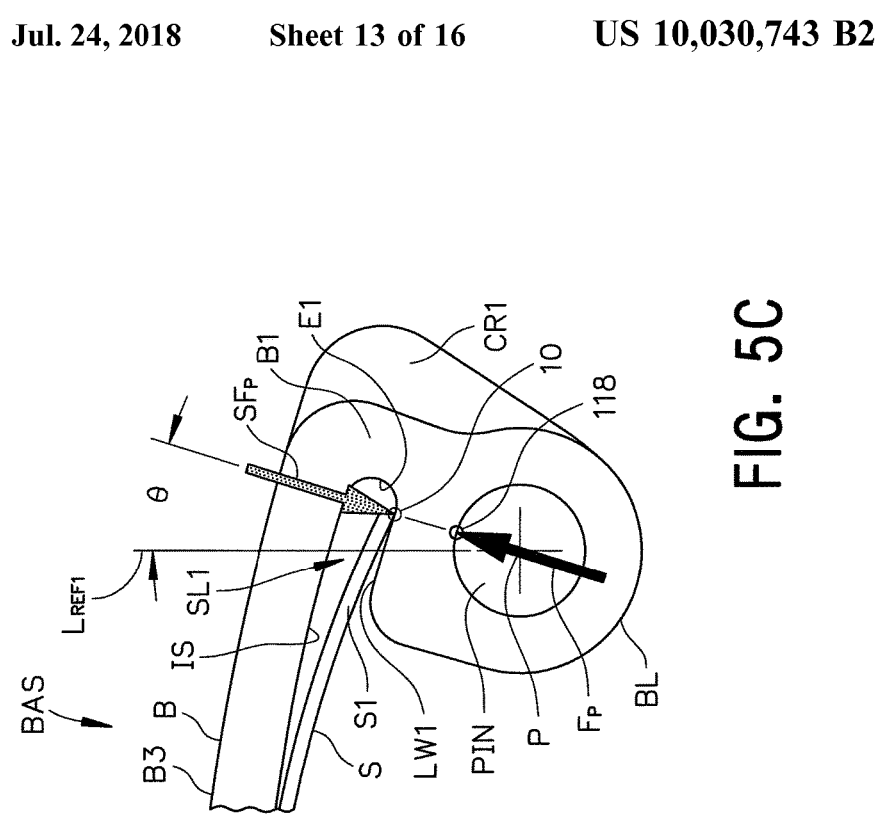
FIGS. 5B & 5C are enlarged views of the free end and the pivots end, respectively, of the FIG. 3A blade assembly.
Figure 5B:
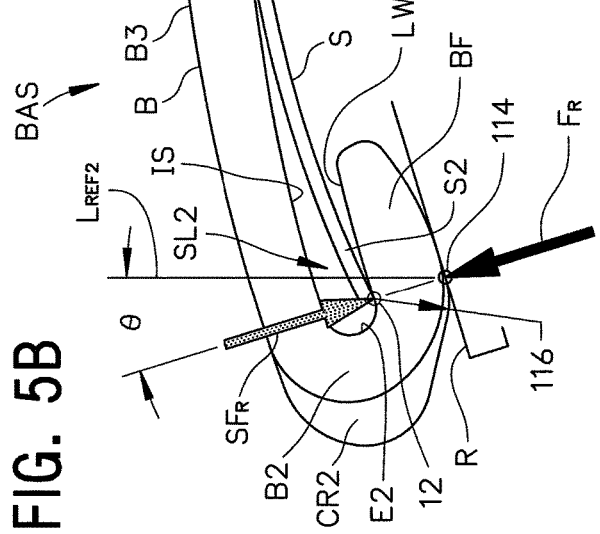

FIG. 5B is an enlarged partial view of the FIG. 5A blade at the free end ramp and FIG. 5C is an enlarged partial view of the FIG. 5A blade at the pivot end. As shown in FIG. 5B, unlike the known blade BAS', the force vectors $SF_R$ and $F_R$ at the blade free end B2 are aligned or coincident with each other to eliminate any offset with respect to each other and to prevent the establishment of any moment arm acting on the lower wall LW2 of the second spring retaining slot SL2 with respect to the spring edge contact location 12. As such, the lower wall LW2 will not deflect toward the inner surface IS as described above for the known blade assembly BAS'. Similarly, as shown in FIG. 5C, the force vectors $SF_P$ and $F_P$ at the blade pivot end B1 are aligned or coincident with each other to eliminate any offset with respect to each other and to prevent the establishment of any moment arm acting on the lower wall LW1 of the first spring retaining slot SL1 with respect to the spring edge contact location 10. As such, deflection of the lower walls LW1,LW2 toward the inner surface IS as described above for the known blade assembly BAS' will be greatly reduced in order to minimize or prevent the associated undesired relative longitudinal motion between the spring ends SE1,SE2 and the lower wall surfaces LW1,LW2 which would otherwise result in cutting or slicing action by the spring ends SE1,SE2 at the end walls E1,E2 as described above for the known blade assembly BAS'.

FIG. 6 shows that, as the chain 15 wears and the slack strand 17 lengthens to its maximum design length, the blade assembly BAS will move to its full travel operative position corresponding to the spring height h2 and the distance $L_E$FT defined between the spring edges SE1,SE2. Because the pivot axis P about which the pivot end of the blade assembly BAS rotates is fixed, the blade assembly BAS must rotate about the pivot axis P slightly as the chain lengthens and the spring height increases from h1 to h2. The contact location 114 of the blade foot BF on the ramp R shifts to contact location 114FT on the ramp R, as the blade assembly BAS shortens and rotates. To further illustrate the movement of the blade assembly BAS, the FIG. 5 (new chain) positions for the first and second spring contact locations 10,12 in the slots SL1,SL2 are also shown in FIG. 6 using broken leader lines. The system is in equilibrium and a summation of the force vectors acting on the blade assembly BAS equals zero. The blade assembly will exert a force $SF_{FT}$ against the chain strand as a function of the deflected height of the tensioner spring S and the chain strand 17 will exert an equal and opposite force $CF_{FT}$ against the blade outer surface OS. In one embodiment, the chain tensioning force at this max length worn chain position is 10 lbs. The force vectors acting on the blade, shown with solid black fill, are the chain force $CF_{FT}$ acting against the outer blade surface OS at the blade midpoint, the bracket ramp force $F_R$FT acting at the free end of the blade against the blade foot BF at the contact location 114FT normal to the ramp surface R at an angle β with respect to a reference line $L_{REF2}$ oriented normal to the line of length $L_E$FT that connects the opposite edges SE1,SE2 of the spring S, and the bracket pivot pin force $F_P$FT acting at a pivot end of the blade against the blade pivot bore PB through its pivot axis/center P at contact location 118FT and also at an angle β relative to a reference line $L_{REF1}$ oriented normal to the line of spring length $L_E$FT to cancel out the horizontal components of the force vectors $F_R$FT,$F_P$FT. The summation of the external force vectors acting on the blade equal zero, and the force vectors $F_R$FT,$F_P$FT are substantially equal. Similarly, the spring force vectors $SF_{FT}$,$SF_R$FT, $SF_P$FT, shown with crosshatch fill, act internal to the blade B and the summation of these force vectors also equals zero. The spring force vectors $SF_P$FT and $SF_R$FT act on the slot lower walls LW1,LW2 at the respective contact locations 10,12.

Figure 6A:
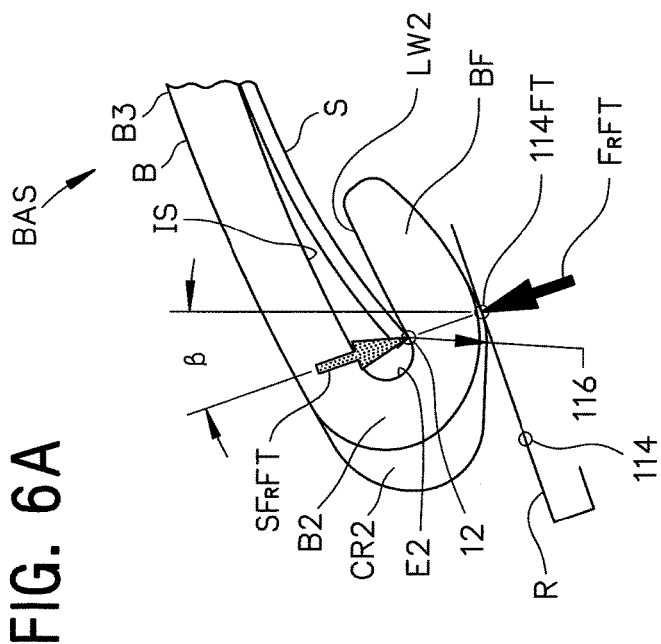

FIG. 6A is an enlarged partial view of the FIG. 6 blade at the free end ramp and FIG. 6B is an enlarged partial view of the FIG. 6 blade at the pivot end. As shown in FIG. 6A, the opposing force vectors $SF_R$FT and $F_R$FT remain aligned and coincident with respect to each other at the blade free end B2, with no adverse moment arm established, because the outer surface of the blade foot BF that is in contact with the ramp R as the chain wears and lengthens is defined as a cylindrical arc segment with a radius 116 having its arc center situated at or coincident with the spring contact location 12 where the spring edge SE2 contacts the slot lower wall LW2 and, as such, the blade foot contact with the bracket ramp R will beneficially remain on the radial surface 116 for the full working travel of the blade assembly BAS. Accordingly, the ramp force vector $F_R$ and said free end spring force vector $SF_R$ are aligned and coincident with each other for both the initial operative position of the blade assembly BAS (FIG. 5) and the full travel operative position of said blade assembly BAS (FIG. 6), and for all operative positions of the blade assembly between the initial operative position and the full travel operative position.

With reference to FIG. 6B, the force vectors $SF_P$FT and $F_P$FT at the blade pivot end B1 are no longer coincident when the blade assembly BAS moves to its full travel position, but the offset or moment arm $d_P$FT established at the blade full travel position remains much less than for known blade assemblies BAS' and small enough that little or no deflection of the slot lower wall LW1 toward the inner surface IS will occur, especially given that the bracket pivot pin force $F_P$FT acting at a pivot end of the blade against the blade pivot bore PB through its pivot axis/center P at contact location 118FT is greatly reduced in magnitude when the blade assembly BAS is in its full travel position as shown in FIG. 6 as compared to its initial install (new chain) position. In an alternative embodiment, the force vectors $SF_P$FT and $F_P$FT at the blade pivot end B1 remain coincident when the blade assembly BAS moves to its full travel position, which can be accomplished if design parameters allow the location of the pivot pin PIN to be moved.

Figure 7A:
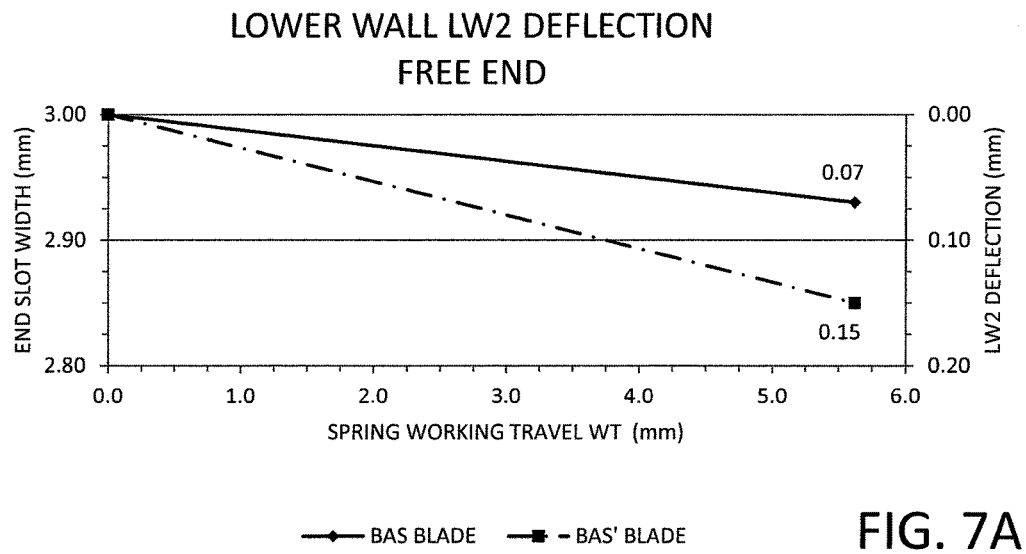
FIGS. 7A & 7B are graphs that illustrate deflection of the blade lower walls at the free end and pivot end, respectively, as a function of spring working travel WT for both the known blade assembly BAS' of FIGS. 1-4B and a blade assembly formed in accordance with the present development such as the blade assembly BAS illustrated in FIGS. 5-6B.
Figure 7B:
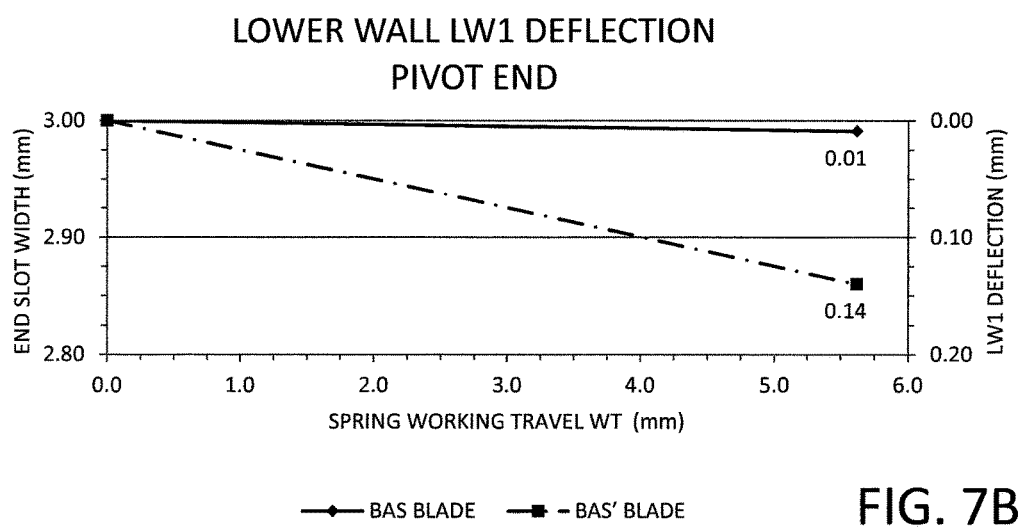

FIGS. 7A & 7B are graphs that illustrate deflection of the blade lower walls LW2,LW1 at the free end and pivot end, respectively, as a function of spring working travel WT for both the known blade assembly BAS' (broken line) and a blade assembly BAS (solid line) formed in accordance with the present development using a worn chain. In the present example, the slots SL1',SL2' for the blade B' and the slots SL1,SL2 for the blade B have a nominal height of 3 millimeters (mm) (as shown on the left axis) as measured at a known reference location which, in the present example, is located in a reference plane arranged normal to the lower wall LW1',LW2,' LW1,LW2 and spaced 6 mm inward from the respective end walls E1',E2' and E1,E2 when measured from a location on the end wall that is midway between the lower wall LW1',LW2,' LW1,LW2 and the inner surface IS',IS. The right axis represents deflection of the lower wall LW1',LW2,' LW1,LW2 toward the inner surface IS',IS in terms of the reduction in the height of the slots SL1',SL2', SL1,SL2, i.e., 0 mm deflection on the right axis corresponds to a full height 3 mm slot on the left axis, while a deflection value of 0.10 mm on the right axis corresponds to a slot height value of 2.9 mm on the left axis to indicate that the lower wall has deflected 0.1 mm toward the inner surface and has reduced the slot height to 2.9 mm. Similarly, a deflection value of 0.2 mm corresponds to the height of the slot SL1',SL2',SL1,SL2 being reduced to 2.8 mm.

Figure 3E:
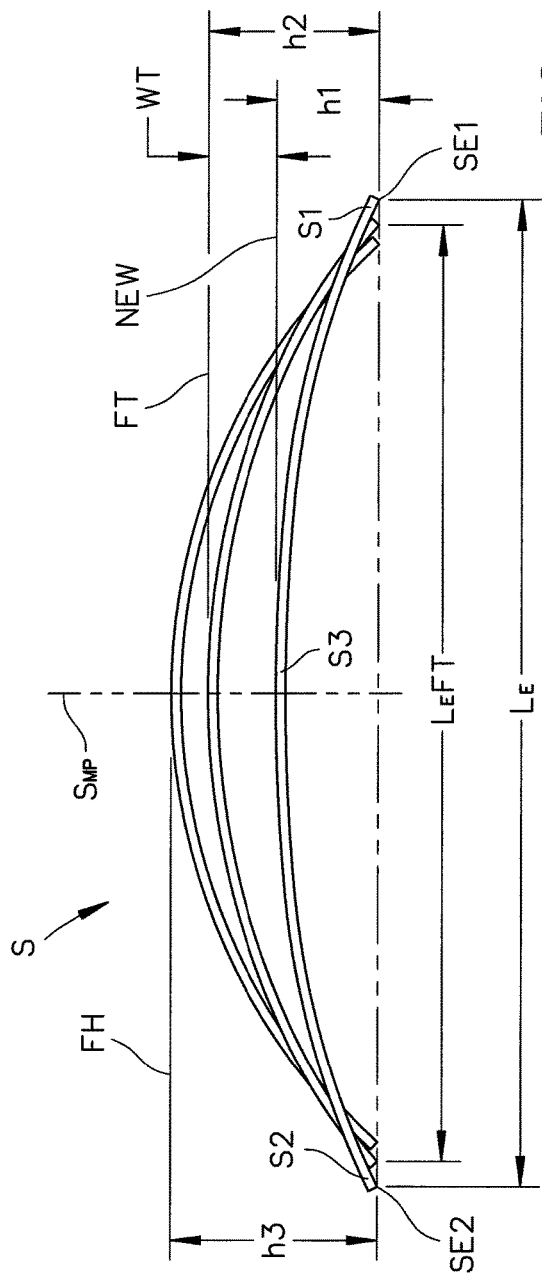
FIG. 3E is similar to FIG. 3D but shows the spring at variable heights depending upon its operative state.
Figure 3F:
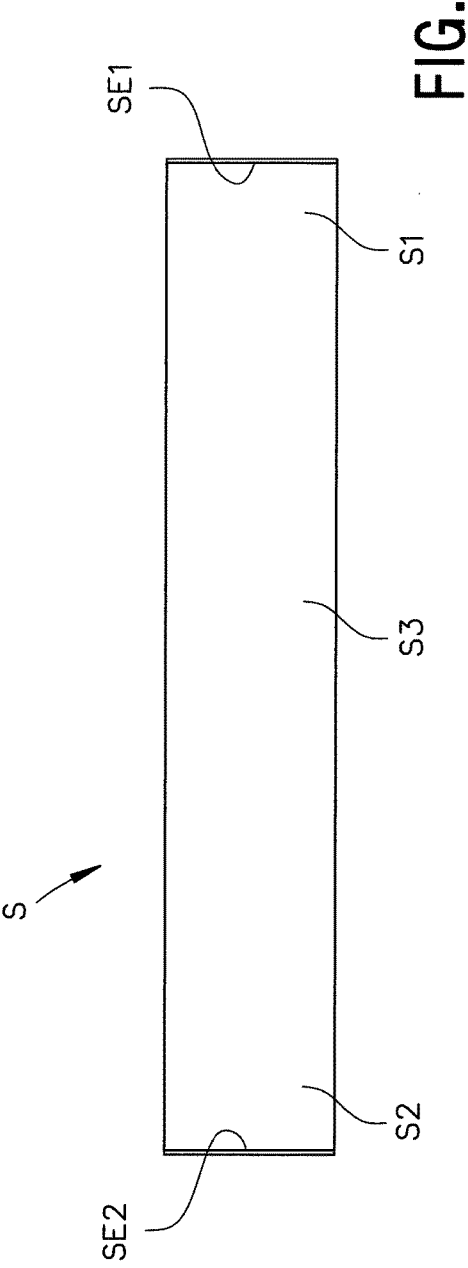
FIG. 3F is a bottom view of the spring (at height h1)
Figure 4:
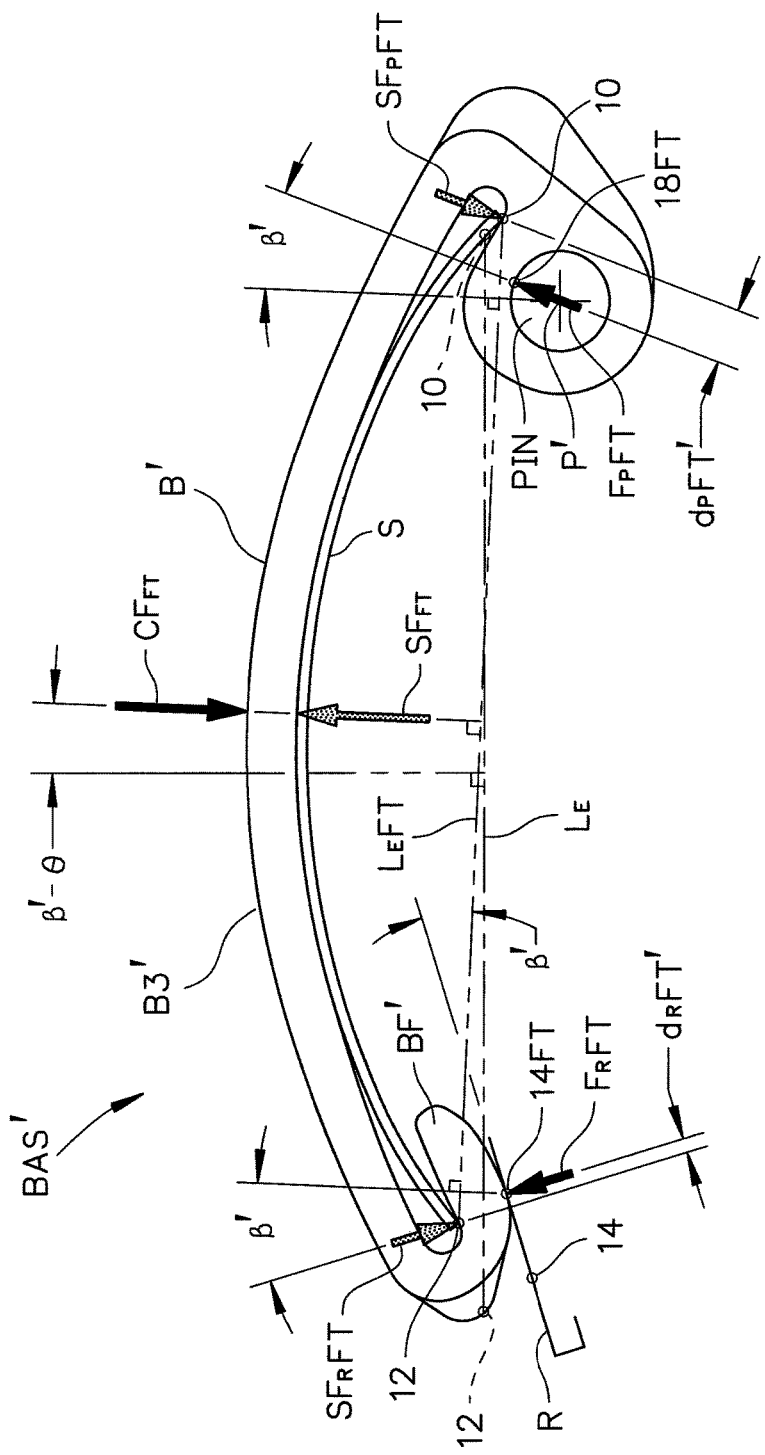
FIG. 4 is similar to FIG. 3A but shows the blade assembly in its full travel position as would occur in association with a worn (elongated) chain.
Figure 4B:
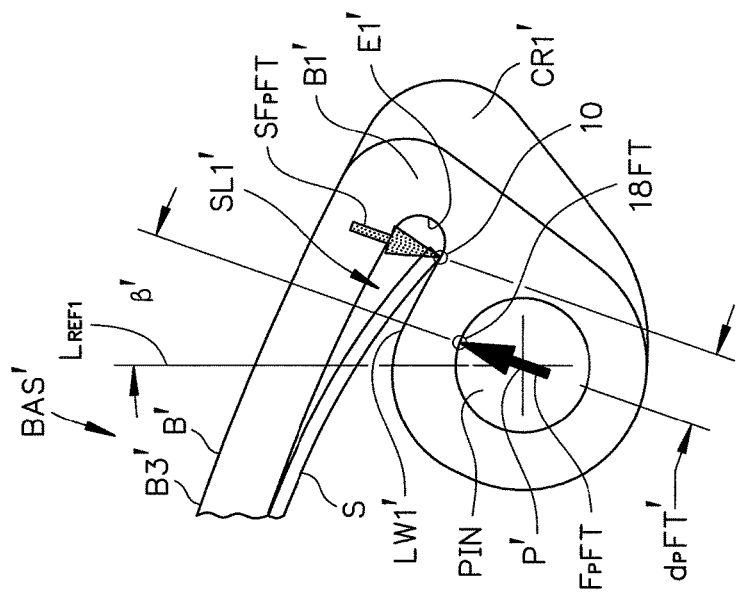
FIGS. 4A & 4B are enlarged views of the free end and pivot end, respectively, of the FIG. 4 blade assembly.
Figure 4A:
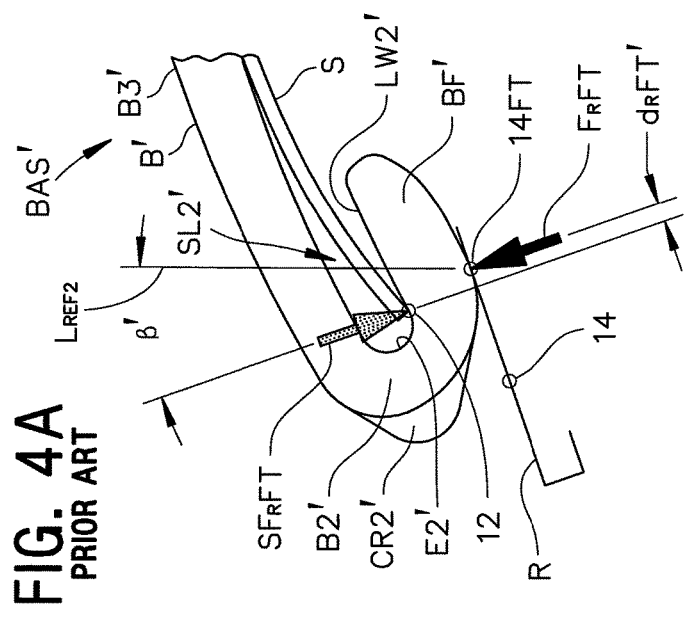

In use, the tensioner blade assembly BAS',BAS will oscillate with the motion AMPL between a blade position as permitted by its worn chain length (see e.g., FIGS. 4 & 6) and a deflected or flattened position (see e.g., FIGS. 3A & 5A), and this oscillation of the blade assembly will correspond to changes in spring height within its working travel range WT, where WT=h2−h1 as shown in FIG. 3E. This change in spring height from its full working travel position h2 to the deflected or flattened h1 position is shown on the horizontal axis where WT=0 indicates the full working travel position h2 of the spring and the values for WT>0 indicate deflection or flattening of the spring toward h1 (WT ranges from 0 mm to 5.62 mm in the present example). FIGS. 7A & 7B represent FEA data that show increased deflection of the slot lower walls LW1',LW2,' LW1,LW2 toward the inner surface IS,IS' as WT and loads increase during flattening of the blade assembly BAS',BAS and spring S. It can be seen, however, that a blade assembly BAS using a blade B structured in accordance with the present development exhibits much less deflection of the lower walls LW1,LW2 as compared to known blade assembly BAS' using a known blade B'. In particular, comparing the known blade assembly BAS' with the present blade assembly BAS, it can be seen that maximum deflection at the free end B2',B2 is reduced from 0.15 mm to 0.07 mm, while maximum deflection at the pivot end B1',B1 is reduced from 0.14 mm to 0.01 mm. Those of ordinary skill in the art will recognize that the alignment of the force vectors $SF_R$ and $F_R$ at the blade free end B2 and the alignment of the force vectors $SF_P$ and $F_P$ at the blade pivot end B1 (at least during maximum loading of the blade assembly BAS) will substantially reduce relative motion between the spring ends SE1,SE2 and the respective lower walls LW1,LW2 and the associated end wall cutting action that occurs with the known blade assembly BAS'. As such, the blade assembly BAS will be more durable than the blade assembly BAS', especially in modern engines that run at higher RPM.

The invention has been described with reference to preferred embodiments. Modifications and alterations will occur to those of ordinary skill in the art to which the invention pertains, and it is intended that the claims be construed as broadly as possible to encompass all such modifications and alterations while preserving the validity of the claims.

The invention claimed is:

1. A chain tensioner comprising:
    a bracket including a main wall, a ramp that projects outwardly from said main wall, and a pin connected to and projecting outwardly from the main wall;
    a blade assembly operatively connected to said bracket, said blade assembly comprising:
    a polymeric blade comprising a first end, a second end, and a central portion that extends between the first end and the second end, said central portion comprising: (i) an outer surface adapted for being slidably engaged by an associated chain; and, (ii) an inner surface located on an opposite side of said central portion relative to said outer surface;
    a pivot bore defined about a pivot axis in the first end of the blade;
    a foot located at the second end of the blade;
    a first spring-receiving slot located in said first end of said blade, said first spring-receiving slot located between said inner surface and a first lower wall that is spaced from said inner surface;
    a second spring-receiving slot located in said second end of said blade, said second spring-receiving slot located between said inner surface and a second lower wall that is spaced from said inner surface;
    a spring comprising a first end located in said first spring-receiving slot, a second end located in said second spring-receiving slot, and a central portion located between the first and second spring ends and in contact with said inner surface of said blade central portion;

said first end of said spring in contact with said first lower wall at a first contact location and said second end of said spring in contact with said second lower wall at a second contact location such that a pivot end spring force vector $SF_P$ acts on said first lower wall at said first contact location and a free end spring force vector $SF_R$ acts on said second lower wall at said second contact location; wherein:

said tensioner blade assembly is mounted on said bracket with said pin located in the pivot bore and with said foot of said blade supported on said ramp;

a pivot pin force vector $F_P$ acts on an inside diameter of said pivot bore through said pivot axis;

a ramp force vector $F_R$ acts on said blade foot at a ramp contact location where said blade foot contacts said ramp;

said ramp force vector $F_R$ and said free end spring force vector $SF_R$ are aligned and coincident with each other.

2. The chain tensioner as set forth in claim 1, wherein said ramp force vector $F_R$ and said free end spring force vector $SF_R$ are aligned and coincident with each other for an initial operative position of said blade assembly.

3. The chain tensioner as set forth in claim 2, wherein said ramp force vector $F_R$ and said free end spring force vector $SF_R$ are also aligned and coincident with each other for a full travel operative position of said blade assembly.

4. The chain tensioner as set forth in claim 3, wherein said ramp force vector $F_R$ and said free end spring force vector $SF_R$ are also aligned and coincident with each other for all operative positions of said blade assembly between said initial operative position and said full travel operative position.

5. The chain tensioner as set forth in claim 4, wherein said foot of said blade comprises an outer surface in contact with said ramp, wherein said outer surface of said foot comprises a cylindrical arc segment comprising a radius including an arc center located at said second contact location where second end of said spring contacts said second lower wall such that said cylindrical arc segment of said blade foot contacts said ramp for said initial operative position of said blade assembly, for said full travel operative position of said blade assembly, and for all operative positions of said blade assembly between said initial operative position and said full travel operative position.

6. The chain tensioner as set forth in claim 2, wherein said pivot pin force vector $F_P$ and said pivot end spring force vector $SF_P$ are aligned and coincident with each other for said initial operative position of said blade assembly.

7. The chain tensioner as set forth in claim 3, wherein said pivot pin force vector $F_P$ and said pivot end spring force vector $SF_P$ are aligned and coincident with each other for said initial operative position of said blade assembly, and said pivot pin force vector $F_P$ and said pivot end spring force vector $SF_P$ are offset relative to each other for said full travel operative position of said blade assembly.

8. The chain tensioner as set forth in claim 3, wherein:
said initial operative position of said blade assembly corresponds to a first height h1 of the spring S in which the spring defines a distance $L_E$ between opposite first and second ends of the spring;
said full travel operative position of said blade assembly corresponds to a second height h2 of the spring S in which the spring defines a distance $L_EFT$ between its opposite first and second ends, wherein h2>h1 and $L_EFT<L_E$.

9. The chain tensioner as set forth in claim 8, further comprising a chain in contact with said outer surface of said blade and exerting a chain force $CF_{MAX}$ against said outer surface of said blade at a midpoint of said blade outer surface that is aligned with a spring midpoint $S_{MP}$ located midway between said opposite first and second ends of the spring.

10. The chain tensioner as set forth in claim 1, wherein said foot of said blade comprises an outer surface in contact with said ramp, wherein said outer surface of said foot comprises a cylindrical arc segment comprising a radius including an arc center located at said second contact location where said second end of said spring contacts said second lower wall.

11. A chain tensioner system comprising:
a bracket including a main wall, a ramp that projects outwardly from said main wall, and a pin connected to and projecting outwardly from the main wall;
a blade assembly operatively connected to said bracket, said blade assembly comprising:
a polymeric blade comprising a first end, a second end, and a central portion that extends between the first end and the second end, said central portion comprising: (i) an outer surface adapted for being slidably engaged by an associated chain; and, (ii) an inner surface located on an opposite side of said central portion relative to said outer surface;
a pivot bore defined about a pivot axis in the first end of the blade;
a foot located at the second end of the blade;
a first spring-receiving slot located in said first end of said blade, said first spring-receiving slot located between said inner surface and a first lower wall that is spaced from said inner surface;
a second spring-receiving slot located in said second end of said blade, said second spring-receiving slot located between said inner surface and a second lower wall that is spaced from said inner surface;
a spring comprising a first end located in said first spring-receiving slot, a second end located in said second spring-receiving slot, and a central portion located between the first and second spring ends and in contact with said inner surface of said blade central portion;
said first end of said spring in contact with said first lower wall at a first contact location and said second end of said spring in contact with said second lower wall at a second contact location such that a pivot end spring force vector $SF_P$ acts on said first lower wall at said first contact location and a free end spring force vector $SF_R$ acts on said second lower wall at said second contact location;
a chain in contact with said outer surface of said central portion of said blade and exerting a chain force against said outer surface of said central portion of said blade;
wherein said tensioner blade assembly is mounted on said bracket with said pin located in the pivot bore and with said foot of said blade supported on said ramp;
a pivot pin force vector $F_P$ acts on an inside diameter of said pivot bore through said pivot axis;
a ramp force vector $F_R$ acts on said blade foot at a ramp contact location wherein said blade foot contacts said ramp;
said ramp force vector $F_R$ and said free end spring force vector $SF_R$ are aligned and coincident with each other.

12. The chain tensioner system as set forth in claim 11, wherein said ramp force vector $F_R$ and said free end spring force vector $SF_R$ are aligned and coincident with each other for an initial operative position of said blade assembly.

13. The chain tensioner system as set forth in claim 12, wherein said ramp force vector $F_R$ and said free end spring force vector $SF_R$ are also aligned and coincident with each other for a full travel operative position of said blade assembly.

14. The chain tensioner system as set forth in claim 13, wherein said ramp force vector $F_R$ and said free end spring force vector $SF_R$ are also aligned and coincident with each other for all operative positions of said blade assembly between said initial operative position and said full travel operative position.

15. The chain tensioner system as set forth in claim 14, wherein said foot of said blade comprises an outer surface in contact with said ramp, wherein said outer surface of said foot comprises a cylindrical arc segment comprising a radius including an arc center located at said second contact location where said second end of said spring contacts said second lower wall such that said cylindrical arc segment of said blade foot contacts said ramp for said initial operative position of said blade assembly, for said full travel operative position of said blade assembly, and for all operative positions of said blade assembly between said initial operative position and said full travel operative position.

16. The chain tensioner system as set forth in claim 12, wherein said pivot pin force vector $F_P$ and said pivot end spring force vector $SF_P$ are aligned and coincident with each other for said initial operative position of said blade assembly.

17. The chain tensioner system as set forth in claim 13, wherein said pivot pin force vector $F_P$ and said pivot end spring force vector $SF_P$ are aligned and coincident with each other for said initial operative position of said blade assembly, and said pivot pin force vector $F_P$ and said pivot end spring force vector $SF_P$ are offset relative to each other for said full travel operative position of said blade assembly.

18. The chain tensioner system as set forth in claim 13, wherein:
said initial operative position of said blade assembly corresponds to a first height h1 of the spring S in which the spring defines a distance $L_E$ between opposite first and second ends of the spring;
said full travel operative position of said blade assembly corresponds to a second height h2 of the spring S in which the spring defines a distance $L_E FT$ between its opposite first and second ends, wherein h2>h1 and $L_E FT < L_E$.

19. The chain tensioner system as set forth in claim 11, wherein an outer surface of said foot of said blade that is in contact with said ramp comprises a cylindrical arc segment defined by a radius having its arc center coincident with said second contact location where said second end of said spring contacts said second lower wall.

20. A blade assembly for a chain tensioner, said blade assembly comprising:
a polymeric blade comprising a first end, a second end, and a central portion that extends between the first end and the second end, said central portion comprising: (i) an outer surface adapted for being slidably engaged by an associated chain; and, (ii) an inner surface located on an opposite side of said central portion relative to said outer surface;
a pivot bore defined about a pivot axis in the first end of the blade;
a foot located at the second end of the blade and comprising an outer surface adapted to engage an associate support surface;
a first spring-receiving slot located in said first end of said blade, said first spring-receiving slot located between said inner surface and a first lower wall that is spaced from said inner surface;
a second spring-receiving slot located in said second end of said blade, said second spring-receiving slot located between said inner surface and a second lower wall that is spaced from said inner surface;
a spring comprising a first end located in said first spring-receiving slot, a second end located in said second spring-receiving slot, and a central portion located between the first and second spring ends and in contact with said inner surface of said blade central portion;
said first end of said spring in contact with said first lower wall at a first contact location and said second end of said spring in contact with said second lower wall at a second contact location;
wherein said outer surface of said foot of said blade comprises a cylindrical arc segment defined by a radius having its arc center located at said second contact location where said second end of said spring contacts said second lower wall.

* * * * *